(12) United States Patent
Otomo

(10) Patent No.: US 11,833,432 B2
(45) Date of Patent: Dec. 5, 2023

(54) INSTRUCTIONS AND INFORMATION PROCESSING DEVICE FOR GAMING

(71) Applicant: SEGA CORPORATION, Tokyo (JP)

(72) Inventor: Takahiro Otomo, Tokyo (JP)

(73) Assignee: SEGA CORPORATION, Tokyo (JP)

( * ) Notice: Subject to any disclaimer, the term of this patent is extended or adjusted under 35 U.S.C. 154(b) by 0 days.

(21) Appl. No.: 17/885,195

(22) PCT Filed: Feb. 15, 2021

(86) PCT No.: PCT/JP2021/005576
§ 371 (c)(1),
(2) Date: Aug. 10, 2022

(87) PCT Pub. No.: WO2021/166863
PCT Pub. Date: Aug. 26, 2021

(65) Prior Publication Data
US 2023/0191258 A1 Jun. 22, 2023

Related U.S. Application Data

(63) Continuation of application No. PCT/JP2021/005576, filed on Feb. 15, 2021.

(30) Foreign Application Priority Data

Feb. 21, 2020 (JP) .................................. 2020-028134
Feb. 21, 2020 (JP) .................................. 2020-028135
Mar. 27, 2020 (JP) .................................. 2020-057524

(51) Int. Cl.
*A63F 13/65* (2014.01)
*A63F 13/216* (2014.01)
*A63F 13/35* (2014.01)

(52) U.S. Cl.
CPC ............ *A63F 13/65* (2014.09); *A63F 13/216* (2014.09); *A63F 13/35* (2014.09)

(58) Field of Classification Search
CPC ......... A63F 13/65; A63F 13/216; A63F 13/35
See application file for complete search history.

(56) References Cited

U.S. PATENT DOCUMENTS 8,845,436 B1    9/2014   Norton et al.
10,549,198 B1 *  2/2020   Zhang ..................... A63F 13/25
(Continued)

FOREIGN PATENT DOCUMENTS

| JP | 3551856 B2 | 8/2004 |
| JP | 2010-136882 A | 6/2010 |

(Continued)

OTHER PUBLICATIONS

"Teku Teku Teku Teku", Weekly Famitsu, Nov. 15, 2018, No. 1563, pp. 24-33 (12 pages).

(Continued)

*Primary Examiner* — Seng H Lim
(74) *Attorney, Agent, or Firm* — Osha Bergman Watanabe & Burton LLP

(57) ABSTRACT

An information processing device includes: an acquisition means for acquiring position information about a player in a real world; a determination means for determining whether or not a specific condition related to a movement or a position of the player has been satisfied based on the position information; a selection means for selecting one or more contents from types of the contents based on appearance frequency, regardless of a request from the player, in response to determining that the specific condition has been satisfied; an accumulation means for accumulating the selected contents in accumulation information associated with the player; and an execution means for executing an (Continued)

event corresponding to the accumulated contents at the request of the player. The execution means gives the player a reward related to the accumulated contents in response to the execution of the event.

12 Claims, 16 Drawing Sheets

(56) References Cited

U.S. PATENT DOCUMENTS

| | | | | |
|---|---|---|---|---|
| 2012/0129590 | A1* | 5/2012 | Morrisroe | A63F 13/332 463/25 |
| 2012/0258802 | A1* | 10/2012 | Weston | A63F 13/825 463/43 |
| 2019/0070510 | A1* | 3/2019 | Kyono | G06Q 20/085 |
| 2019/0143204 | A1* | 5/2019 | Aman | A63F 13/30 463/31 |
| 2021/0352261 | A1* | 11/2021 | Watson | A63F 13/35 |
| 2022/0051372 | A1* | 2/2022 | Toft | G06T 3/00 |
| 2022/0189060 | A1* | 6/2022 | Türkoglu | G06T 7/11 |
| 2023/0072762 | A1* | 3/2023 | Liu | A63F 13/5372 |

FOREIGN PATENT DOCUMENTS

| | | |
|---|---|---|
| JP | 2016-181154 A | 10/2016 |
| JP | 2017-113174 A | 6/2017 |
| JP | 2018-064713 A | 4/2018 |
| JP | 6404490 B2 | 10/2018 |
| JP | 2019-165879 A | 10/2019 |
| WO | 2017/090274 A1 | 6/2017 |
| WO | 2019/088173 A1 | 5/2019 |

OTHER PUBLICATIONS

Takeiri, Akio et al., "The PlayStation2 Books Shin Megami Tensei III: Nocturne, Maniax, Nakama Directory Guide Book", 1st edition, Softbank Publishing Inc., Mar. 24, 2004, ISBN 4-7973-2678-6, pp. 424-429 (9 pages).
International Search Report issued in corresponding International Application No. PCT/JP2021/005576 dated Apr. 6, 2021 (7 pages).
Written Opinion issued in corresponding International Application No. PCT/JP2021/005576 dated Apr. 6, 2021 (6 pages).
Notice of Reasons for Refusal issued in corresponding Japanese Application No. 2020-028134 dated Jun. 16, 2020 (16 pages).
Decision to Grant a Patent issued in corresponding Japanese Application No. 2020-028134 dated Aug. 11, 2020 (5 pages).

* cited by examiner

INSTRUCTIONS AND INFORMATION PROCESSING DEVICE FOR GAMING

BACKGROUND

Technical Field

The present invention relates to instructions and an information processing device for gaming.

Description of Related Art

There are conventional position information games reflects the real-world position and movement of the player in the game world.

In this regard, Patent Literature 1 discloses a technique related to a game in which the movement or position of a player in the real world is reflected in a virtual world.

PATENT LITERATURE

Patent Literature 1: Japanese Patent No. 3,551,856

In a game such as this, because the movement or position of the player is reflected in what happens in the game, the player could become preoccupied with the game screen while walking around or riding a bicycle, which can be dangerous.

SUMMARY

One or more embodiments provide a technological improvement over such conventional gaming devices. In particular, instructions and an information processing device according to one or more embodiments provide a game that can be played safely while reflecting the movement or position of the player, without risk of the player losing interest in the game. This provides a practical, technological improvement over conventional gaming devices that would be readily appreciated by those skilled in the art. Further details regarding the various improvements and advantages will become apparent from the descriptions that follow.

According to one or more embodiments, instructions stored in a non-transitory computer-readable recording medium, cause a computer to function as: an acquisition means for acquiring position information about the player in the real world; a determination means for determining whether or not a specific condition related to the movement or position of the player has been satisfied on the basis of the position information; a selection means for selecting one or more sets of content from a plurality of types of content on the basis of appearance frequency regardless of any request from the player, in the event that the determination is positive; an accumulation means for accumulating the selected content in accumulation information associated with the player; and an execution means for executing an event corresponding to the accumulated content at the request of the player, wherein the execution means grants the player rewards related to the accumulated content in response to the execution of the event.

According to one or more embodiments, the selection means selects the content on the basis of the position information.

According to one or more embodiments, the execution means permits execution of the event regardless of whether or not the player is moving.

According to one or more embodiments, the execution means restricts the execution of the event when the player is moving.

According to one or more embodiments, the accumulation means limits the number of sets of content accumulated in the accumulation information to a specific value or less.

According to one or more embodiments, if the number of sets of content accumulated in the accumulation information reaches a specific value, when new content is to be accumulated, the accumulation means prioritizes content having a greater reward or content having a lower frequency of appearance.

According to one or more embodiments, if the number of sets of content accumulated in the accumulation information reaches a specific value, when new content is to be accumulated, the accumulation means prioritizes content associated with a reward that the player has not yet acquired.

According to one or more embodiments, the execution means executes an event in which the accumulated content is encountered, and if the number of sets of content accumulated in the accumulation information has reached a specific value, when new content is to be accumulated, the accumulation means prioritizes content that the player has not yet encountered.

According to one or more embodiments, the content is associated with a period of possible accumulation according to the appearance frequency of the content, and the accumulation means deletes any content for which the period of possible accumulation has elapsed from the accumulation information.

According to one or more embodiments, the accumulation means accumulates one or more sets of the selected content as a single group in the accumulation information and limits the number of the groups to be accumulated to a specific value or less and, at the request of the player, the execution means executes an event corresponding to a group accumulated in the player's accumulation information.

According to one or more embodiments, if the number of groups accumulated in the accumulation information has reached a specific value, when a new group is to be accumulated, the accumulation means prioritizes groups having a greater reward or groups including content having a lower frequency of appearance.

According to one or more embodiments, the groups are associated with a period of possible accumulation according to the appearance frequency of the content included in the group, and the accumulation means deletes any groups in which the period of possible accumulation has elapsed from the accumulation information.

According to one or more embodiments, the specific condition is that the player must be moving.

According to one or more embodiments, the specific condition is that the player must have moved a specific distance.

According to one or more embodiments, the specific condition is that the position information must be in the vicinity of a specific position.

According to one or more embodiments, an information processing device comprises: an acquisition means (a controller) for acquiring position information about the player in the real world; a determination means (the controller) for determining whether or not a specific condition related to the movement or position of the player has been satisfied on the basis of the position information; a selection means (the controller) for selecting one or more sets of content from a plurality of types of content on the basis of appearance frequency regardless of any request from the player, in the event that the determination is positive; an accumulation means (the controller) for accumulating the selected content in accumulation information associated with the player; and an execution means (the controller) for executing an event corresponding to the accumulated content at the request of the player, wherein the execution means grants the player rewards related to the accumulated content in response to the execution of the event.

One or more embodiments can provide a position information game that can be played safely and that reflects the movement or position of the player without risk of the player losing interest in the game.

DETAILED DESCRIPTION

Figure 1:
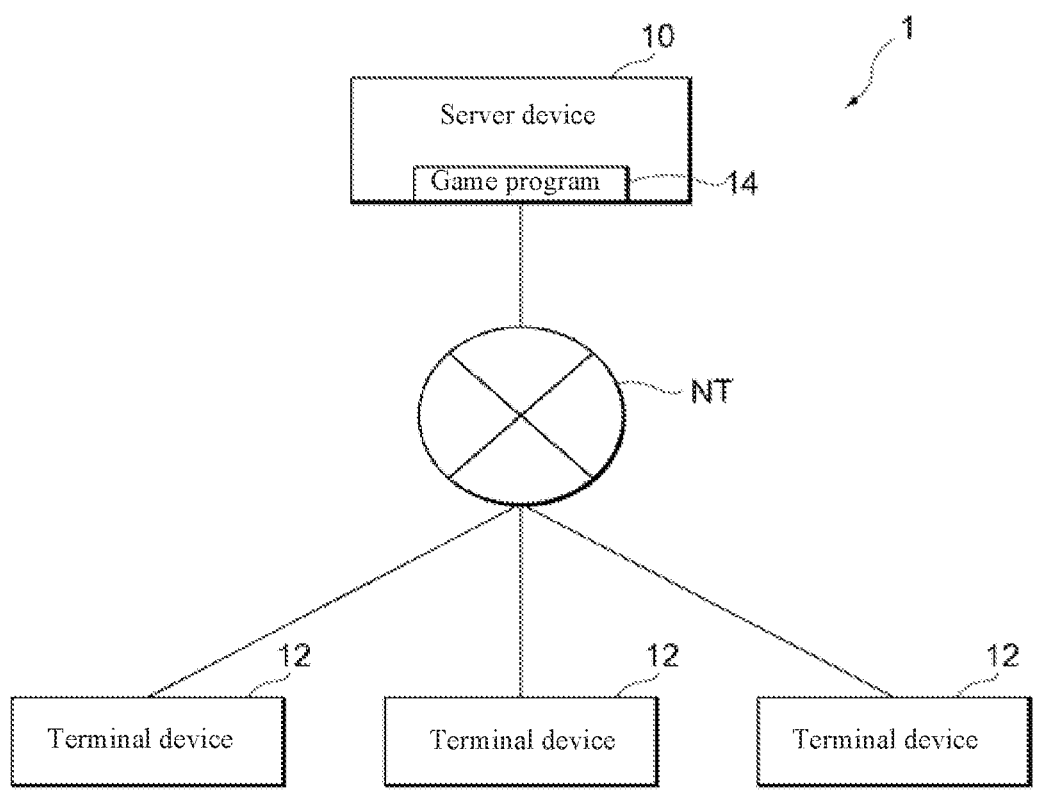
FIG. 1 is a block diagram showing an example of the overall configuration of the game system according to one or more embodiments.

A number of embodiments of the present invention will now be described with reference to the appended drawings. In order to facilitate an understanding of the description, components and steps that are the same in the drawings will be numbered the same and redundant description will be omitted.

First Example

First of all, a first example will be described.

Overall Configuration

FIG. 1 is a block diagram showing an example of the overall configuration of a game system 1 according to one or more embodiments.

As shown in FIG. 1, the game system 1 comprises a server device 10 and one or more terminal devices 12. The server device 10 and terminal devices 12 are communicably connected via a communication network NT such as an intranet, the Internet, or a telephone line.

The server device 10 is an information processing device that provides the players of the terminal devices 12, via the communication network NT, with the execution results of a game obtained by executing a game program (game instructions) 14 or of the game program 14 itself. In one or more embodiments, the server device 10 provides the game program 14 itself to the players of the terminal devices 12.

Each terminal device 12 is an information processing device owned by a player, and is an information processing device that provides a game to a player by executing the game program 14, which is received from the server device 10 and then installed. Examples of these terminal devices 12 may include video game machines, arcade game machines, mobile phones, smartphones, tablets, personal computers, and various other such devices.

Hardware Configuration

Figure 2:
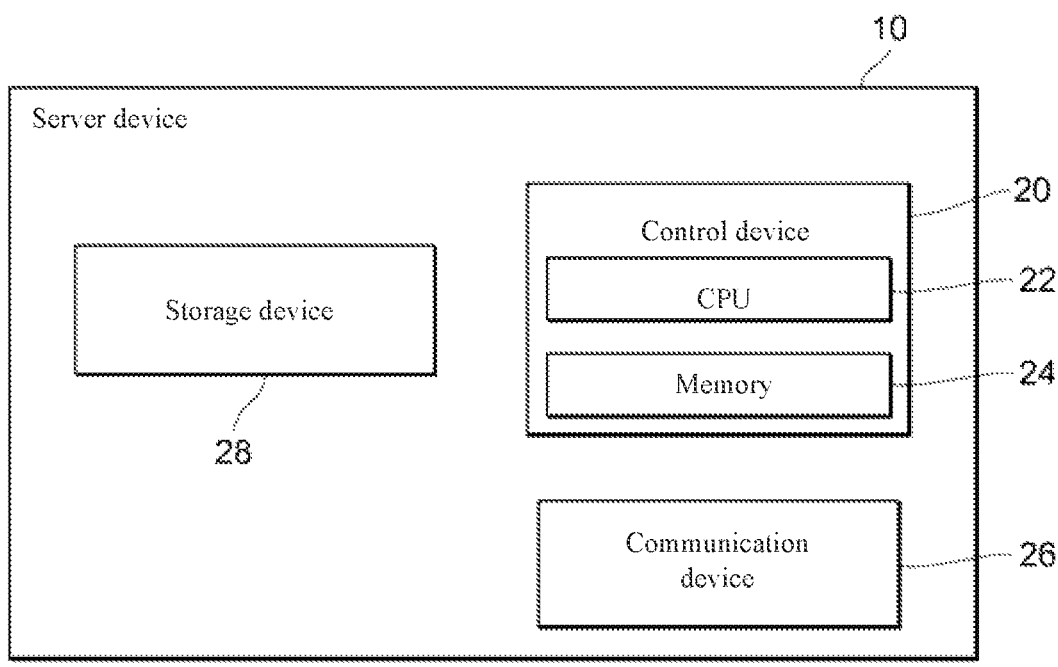
FIG. 2 is a diagram schematically showing an example of the hardware configuration of a server device according to one or more embodiments.

FIG. 2 is a diagram schematically showing an example of the hardware configuration of the server device 10.

As shown in FIG. 2, the server device 10 comprises a control device 20, a communication device 26, and a storage device 28. The control device 20 is mainly constituted by a CPU (central processing unit) 22 and a memory 24.

The control device 20 can function as various functional means by having the CPU 22 execute specific programs (instructions) stored in the memory (including a non-transitory computer-readable recording medium) 24, the storage device (including a non-transitory computer-readable recording medium) 28, or the like. These functional means will be described in detail below.

The communication device 26 is constituted by a communication interface or the like for communicating with an external device. The communication device 26 transmits and receives various information to and from the terminal devices 12, for example.

The storage device 28 is constituted by a hard disk or the like. The storage device 28 stores various kinds of program (instructions) and various kinds of information necessary for executing processing in the control device 20, including the game program 14, as well as information about processing results.

The server device 10 can be an information processing device such as a dedicated or general-purpose server computer. Also, the server device 10 may be constituted by a single information processing device, or may be constituted by a plurality of information processing devices distributed on the communication network NT. Also, FIG. 2 shows only a part of the main hardware configuration of the server device 10, and the server device 10 can comprise other components that are ordinarily provided to a server. Also, the hardware configuration of the plurality of terminal devices 12 may have the same configuration as the server device 10 except for comprising an operating means, a display device, and a sound output device, for example.

Figure 3:
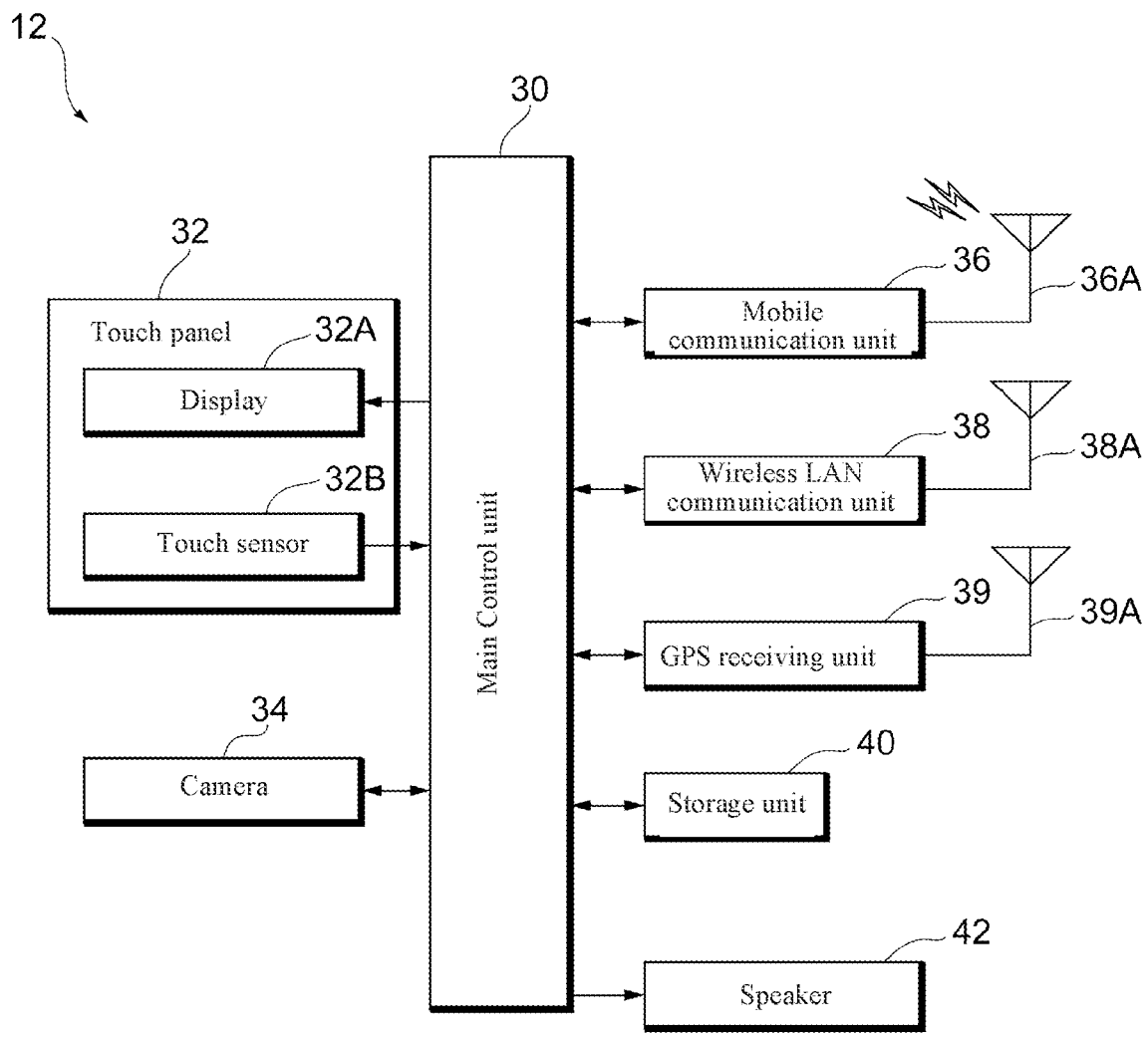
FIG. 3 is a diagram showing an example of the hardware configuration of a smartphone serving according to one or more embodiments as the terminal device shown in FIG. 1.

FIG. 3 is a diagram showing an example of the hardware configuration of a smartphone serving as the terminal device 12 shown in FIG. 1.

As shown in FIG. 3, the terminal device 12 comprises a main control unit 30, a touch panel (touch screen) 32, a camera 34, a mobile communication unit 36, a wireless LAN communication unit 38, a GPS receiving unit 39, a storage unit 40, and a speaker 42.

The main control unit 30 includes a CPU, a memory, and the like. This main control unit 30 is connected to the touch panel 32 (used as a display input device), the camera 34, the mobile communication unit 36, the wireless LAN communication unit 38, the GPS receiving unit 39, the storage unit 40, and the speaker 42. The main control unit 30 has the function of controlling these connected devices.

The touch panel 32 has both a display function and an input function, and is constituted by a display 32A that handles the display function, and a touch sensor 32B that handles the input function. In one or more embodiments, the display 32A can display game images including button images, a cross key image, a joystick image, and other such operation input images. The touch sensor 32B can sense the input position of the player with respect to a game image.

The camera 34 has the function of capturing still and/or moving images and storing these images in the storage unit 40.

The mobile communication unit 36 is connected to a mobile communication network via an antenna 36A, and has the function of communicating with other communication devices that are connected to this mobile communication network.

The wireless LAN communication unit 38 is connected to the communication network NT via an antenna 38A, and has the function of communicating with other devices, such as the server device 10, that are connected to the communication network NT.

The GPS receiving unit 39 has the function of receiving radio waves from GPS satellites via the antenna 39A and acquiring position information indicating the current position. This position information may be latitude and longitude, for example.

The storage unit 40 stores various kinds of program (instructions) and data, such as the game program 14, and play data indicating player information or the progress of the game in the game program 14. This play data may be stored in the server device 10.

The speaker 42 has the function of outputting game sounds and so forth.

Game Overview

The game according to one or more embodiments is a position information game that reflects the real-world position and movement of the player in the game world. With this game, for example, when the player moves in the real world, the player character disposed in the game field (virtual world) also moves. A player character is one or more characters that are available to the player in the game. The player issues an instruction to the player character by performing an input operation or the like on the touch panel 32.

Also, with the game according to one or more embodiments, there is a field mode and an event mode. The field mode is a mode in which a player character moves in the game field. In this field mode, the player instructs the player character to equip itself with (attach or remove) an equipment item that is owned, or to use (consume) a consumable item that is owned. Equipment items include, for example, weapons, armor, accessories, and so forth. Examples of consumable items may include tools for restoring hit points of player characters, tools for eliminating status abnormalities of player characters (such as paralysis or confusion), and tools for strengthening equipment items. The event mode is a mode in which the player moves in the real world, that is, the player character moves in the game field to perform an event corresponding to an enemy character or a boss character that appears (is encountered) in the game field. This event is, for example, a battle game in which a player character plays a battle against an enemy character or a boss character. In this battle game, the player instructs the player character to attack an enemy character (ordinary monster) or boss character (boss monster) that has appeared, or to use skills, defend, use (consume) items, or the like. For example, when the player (player character) defeats an enemy character, that is, when a battle game has been cleared, a reward is given to the player. A victory is, for example, when the hit points of an enemy character are reduced to zero or less. Examples of rewards may include experience value for growing (raising to the next level) a player character, currency (such as medals or coins) that can be used in the game, drop items (such as equipment items or consumable items), and so on. If an enemy character's ability is high, or the appearance frequency is low, for example, a large amount of experience value or currency, or drop items with high rarity, will be given as a reward. Thus, the event mode is more interesting than the field mode because battle games against enemy characters are played and rewards are given to the player.

Also, in the game according to one or more embodiments, there are a plurality of types of quest, each of which is given a different name (title). A quest can be selected by the player on the quest menu screen, etc. This quest is associated with enemy characters that appear in the game field and boss characters that appear at the goal location of the quest. For instance, the player can select a new quest by winning a battle against a boss character. The new quest will be set to a higher difficulty level than, for example, quests that the player can already select, and the abilities of the enemy characters and boss characters will be higher.

Also, in the game according to one or more embodiments, the goal location for each quest is set at a landmark in the real world of the player, that is, a virtual landmark in the game field. Examples of these landmarks may include commercial facilities, public facilities, sightseeing spots, and the like. On the way to a goal location in a quest, the player can encounter enemy characters according to the quest or position information. The player can also encounter boss characters corresponding to that quest by moving to the vicinity (such as within a radius of 20 meters) of a landmark where a goal location of the quest has been set. The goal location in each quest may be set by the player or by the game manager.

Functional Means

Figure 4:
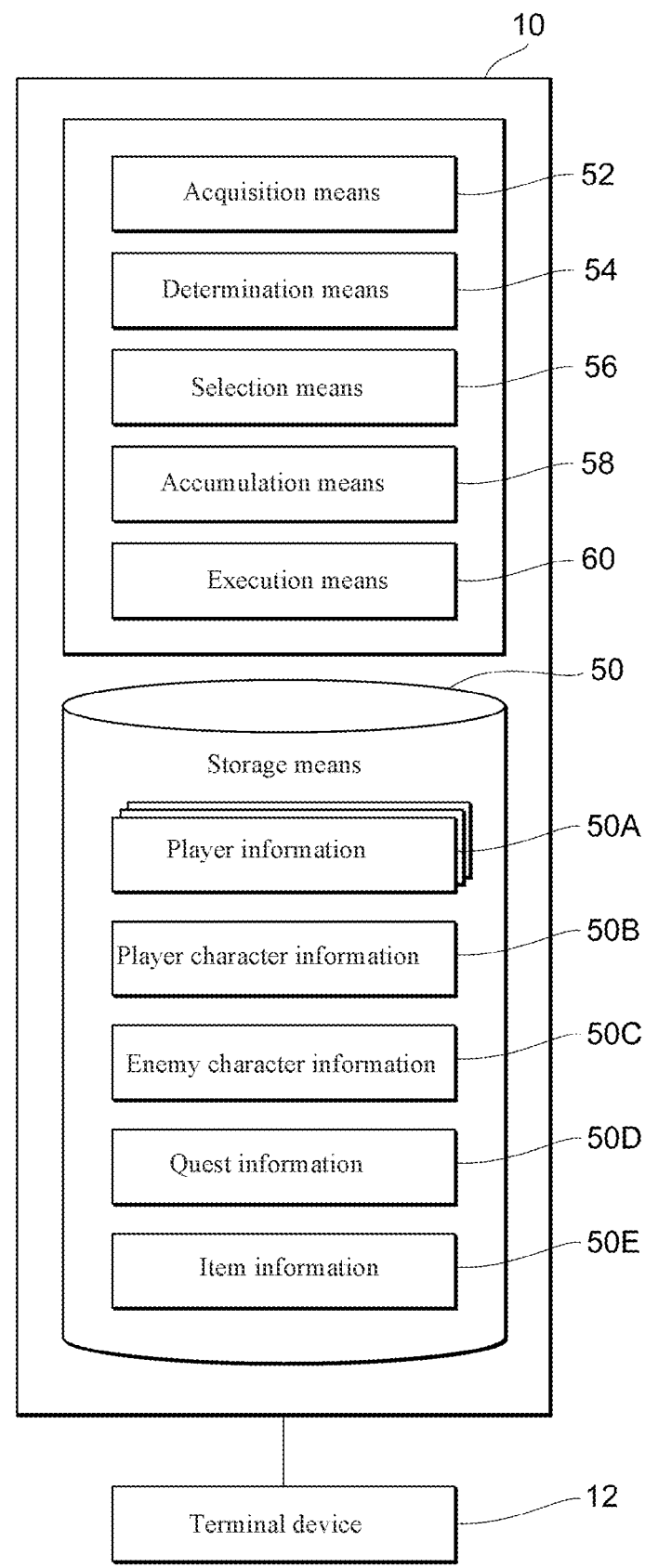
FIG. 4 is a block diagram showing an example of the functional configuration of a server device according to one or more embodiments.

FIG. 4 is a block diagram showing an example of the functional configuration of the server device 10.

As shown in FIG. 4, the server device (including a controller such as CPU 22) 10 comprises, as functional components, a storage means 50, an acquisition means 52, a determination means 54, a selection means 56, an accumulation means 58, and an execution means 60. The storage means (including a non-transitory computer-readable recording medium) 50 is realized by one or more storage devices 28. Functional means other than the storage means 50 are realized by having the control device 20 execute the game program 14 stored in the storage device 28, etc.

The storage means 50 is a functional means for storing player information 50A, player character information 50B, enemy character information 50C, quest information 50D, item information 50E, and so forth.

The player information 50A is stored for each player in association with a player ID for that player. The player information 50A may include, for example, the player's name and age, utilized character information, possessed item information, acquired item information, encounter information, quest execution information, position information history, and accumulation information. The utilized character information includes character IDs, ability information, and the status information for the various player characters that can be used by the player. Ability information includes ability values and skill information. The ability value may include, for example, the total experience value (level), hit points, attack power, defense power, and so forth. The total experience value increases when experience value is gained in a battle against an enemy character. As the total experience value increases, the player character's level increases, hit points, attack power, and defense power increase, and new skills are learned. The skill information includes skill IDs for the skills that the player character has learned (can use). Examples of these skills include magic that restores the hit points of a player character and a special move for attacking an enemy character with a fire attribute. The status information includes flags indicating whether the status is normal or abnormal. For example, the status information may include a flag related to paralysis and a flag related to confusion. The possessed item information includes the item IDs and quantity of items (equipment items and consumable items) owned by the player. The acquired item information includes item IDs for items that have been acquired and for items that have not yet been acquired. The encounter information includes character IDs of enemy characters that have been encountered and character IDs of enemy characters that have not yet been encountered. The quest execution information includes the quest ID and goal location of the quest being executed by the player, and the quest IDs of quests that can be selected by the player. The goal location includes position information about landmarks in the real world. The position information history includes the times at which the acquisition means 52 acquired the position information so far, and position information at those times. The position information history may include, for example, a history of position information for one hour. The accumulation information includes group information, appearance positions, and accumulation periods for each enemy character that has appeared in the game field, in association with the character IDs of those enemy characters. Enemy characters (character IDs) up to a specific number value (such as 20) are accumulated in this accumulation information. The group information is a value for showing enemy characters appearing at the same time as a single group. The appearance position includes position information in the real world where enemy characters have appeared. The accumulation period includes the elapsed period (elapsed time) since the character ID of an enemy character was accumulated (stored).

The player character information 50B is stored for each player character in association with the character ID of that player character. The player character information 50B may include, for example, the name and image of the player character, the required experience value for each level, ability information corresponding to the level, items with which the player character can be equipped, and the like.

The required experience value for each level includes the total experience value required to reach each level. Examples of ability information according to the level include the learning level of various skills, and the ability value (hit points, attack power, defense power, etc.) for each level. Information about items with which the player character can be equipped includes the item ID of an equipment item.

The enemy character information 50C is stored for each enemy character in association with the character ID of that enemy character. Enemy characters also include boss characters. The enemy character information 50C may include, for example, the name and image of the enemy character, its appearance frequency, its appearance area, its period of possible accumulation, ability information, reward information, and the like. The appearance frequency includes a numerical value according to the frequency with which an enemy character appears in the game field. For instance, "50" is set for the enemy character with the highest appearance frequency (lowest rarity), and "1" is set for the enemy character with the lowest appearance frequency (highest rarity). The appearance area includes the real-world area (range) in which an enemy character appears. This area may be, for example, the range indicating the latitude and longitude in the real world. The appearance area may also be an area (range) indicated by the coordinates of the game field. When an enemy character appears, the period of possible accumulation includes the period (time limit) during which the enemy character can be accumulated in the accumulation information of the player information 50A. For example, this period of possible accumulation is associated with a period that is longer in proportion to appearance frequency, and is associated with a period that is shorter in proportion to appearance frequency. For example, if the appearance frequency is "50," the period of possible accumulation is associated with "50 hours," and if the appearance frequency is "1," the period of possible accumulation is associated with "1 hour." Ability information includes ability values and skill information. Reward information includes experience value, amount of currency, and drop item information. The drop item information includes the item IDs of drop items, and the drop rate. The drop rate is the probability that a drop item will be awarded to the player as a reward.

The quest information 50D is stored for each quest in association with the quest ID for that quest. This quest information 50D may include, for example, the name of the quest, character appearance information, and goal information. The character appearance information includes character IDs of the various characters that appear in the game field during quest execution. For example, the character appearance information may include character IDs of enemy characters (ordinary monsters) or of boss characters (boss monsters) that appear at the goal.

The item information 50E is stored for each item in association with the item ID of that item. This item information 50E includes the name and image of the item, and the item classification, rarity, and effect. The item classification includes flag values indicating the classification of weapons, armor, and other such equipment items, and of consumable items such as tools. Rarity may include, for example, a number from 1 to 6. For example, an item with a high rarity is set to have an effect that makes it advantageous to play against an enemy character. Effects include, for example, the value by which the ability value changes (rises or falls) when a player character equips itself with an equipment item, the value by which the player character's hit points are restored by the use of a consumable item, and so forth.

The acquisition means 52 is a functional means for acquiring position information. In one or more embodiments, the acquisition means 52 acquires information about the position of the player in the real world. For example, the acquisition means 52 acquires the latitude and longitude of the terminal device 12 owned by the player, indicating its current position, from the GPS receiving unit 39 at regular time intervals (such as every 5 seconds). Also, for example, the acquisition means 52 stores the acquisition time and position information in the position information history of the player information 50A.

The determination means 54 is a functional means for making various determinations. In one or more embodiments, the determination means 54 determines whether or not a specific condition related to the movement or position of the player has been satisfied on the basis of the position information acquired by the acquisition means 52. Examples of this specific condition include that the player must be moving, that the player must have moved a specific distance, and that the position information must be in the vicinity of a specific position. For example, the determination means 54 determines whether or not the player is moving at a specific speed (such as 1 to 2 meters per second) according to the position information (position information history) acquired by the acquisition means 52 at regular time intervals (such as every 5 seconds). More specifically, the determination means 54 calculates the average moving speed of the player within a specific length of time (such as 30 seconds) according to the quotient (speed) obtained by dividing the difference (distance) between the front and rear position information included in the position information history by at regular intervals (5 seconds), and determines whether or not this average moving speed is within the range of 1 to 2 meters per second. Also, for example, the determination means 54 determines whether or not the player has moved a specific distance (such as 5 km) according to the position information acquired by the acquisition means 52 at regular time intervals. More specifically, the determination means 54 calculates the sum obtained by adding up the differences (distances) between the front and rear position information included in the position information history, that is, the player's total movement distance during a specific length of time (such as 1 hour), and determines whether or not this total movement distance has reached 5 km. Also, for example, the determination means 54 determines whether or not this position information is in the vicinity of a specific position (such as within 10 meters) according to the position information acquired by the acquisition means 52. Examples of this specific position include one or more landmarks. This specific position may be changed at regular intervals (such as once a day).

The selection means 56 is a functional means for selecting enemy characters (content). In one or more embodiments, the selection means 56 selects one or more enemy characters from a plurality of types of enemy characters on the basis of their appearance frequency, regardless of any request from the player, in the event that the determination by the determination means 54 is positive. For example, if the player is moving at a specific speed, the selection means 56 automatically selects one or more enemy characters on the basis of the appearance frequency of a plurality of types of enemy characters appearing in the quest being executed by the player. More specifically, the selection means 56 refers to the player information 50A and the quest information 50D, and acquires the enemy character appearance information associated with the quest ID of the quest being executed by the player. Then, the selection means 56 refers to the enemy character information 50C and acquires the appearance frequency of each of the enemy characters appearing in the game field included in the acquired enemy character appearance information. Then, the selection means 56 divides the appearance frequency of each enemy character by the total appearance frequencies of enemy characters to calculate the appearance probability of a given enemy character. The selection means 56 then selects one or more enemy characters at random according to this appearance probability. For example, if the appearance frequency of an enemy character A is "50" and the total appearance frequency of enemy characters is "250," the appearance probability of the enemy character A is "20%." The selection means 56 randomly determines the number of enemy characters to be selected.

Also, the selection means 56 selects enemy characters on the basis of the position information acquired by the acquisition means 52. For example, the selection means 56 selects an enemy character whose appearance area includes the acquired position information. More specifically, the selection means 56 refers to the enemy character information 50C and selects an enemy character whose appearance area includes the latitude and longitude matching the acquired position information. In this case, the selection means 56 may select an enemy character different from the enemy characters appearing in the quest being executed by the player.

The accumulation means 58 is a functional means for accumulating various types of information in the accumulation information associated with the player. In one or more embodiments, the accumulation means 58 may accumulate one or more enemy characters selected by the selection means 56 in the accumulation information associated with the player. For example, in the accumulation information the accumulation means 58 may accumulate (store) group information and an accumulation period in association with the character ID of one or more selected enemy characters.

Also, the accumulation means 58 may limit the number of enemy characters accumulated in the player's accumulation information to a specific value (such as 20) or less. For example, when the number of enemy characters accumulated in the accumulation information has reached the specific value, the accumulation means 58 will not accumulate any new enemy characters in the accumulation information.

Also, if the number of enemy characters accumulated in the player's accumulation information has reached the specific value, when a new enemy character selected by the selection means 56 is to be accumulated, the accumulation means 58 may prioritize enemy characters with a large reward or enemy characters with a low appearance frequency.

For example, the accumulation means 58 may refer to the reward information in the enemy character information 50C and acquire the experience values of the enemy characters accumulated in the player's accumulation information and the experience values of any new enemy characters. Then, the accumulation means 58 may compare the experience value of the enemy character with the lowest experience value among the enemy characters accumulated in the accumulation information against the experience value of the new enemy character. Then, if the experience value of the new enemy character is higher, the accumulation means 58 may delete information about the enemy character having the lowest experience value from the accumulation information and replace this with information about the new enemy character in the accumulation information.

Also, for example, the accumulation means 58 may refer to the reward information of the enemy character information 50C and acquire the amount of currency of the enemy characters accumulated in the player's accumulation information and the amount of currency of the new enemy character. Then, the accumulation means 58 may compare the amount of currency of the enemy character having the lowest amount of currency among the enemy characters accumulated in the accumulation information against the amount of currency of the new enemy character. If the amount of currency of the new enemy character is higher, the accumulation means 58 may delete information about the enemy character having the lowest amount of currency from the accumulation information and replace this with information about the new enemy character in the accumulation information.

Also, for example, the accumulation means 58 may refer to the appearance frequency of the enemy character information 50C and acquire the appearance frequency of the enemy characters accumulated in the player's accumulation information and the appearance frequency of the new enemy character. Then, the accumulation means 58 may compare the appearance frequency of the enemy character having the highest appearance frequency among the enemy characters accumulated in the accumulation information against the appearance frequency of the new enemy character. If the appearance frequency of the new enemy character is lower, the accumulation means 58 may delete information about the enemy character having the highest appearance frequency from the accumulation information and replace this with information about the new enemy character in the accumulation information.

Also, if the number of enemy characters accumulated in the player's accumulation information has reached a specific value, when the new enemy character selected by the selection means 56 is to be accumulated, the accumulation means 58 may prioritize enemy characters associated with a reward that the player has not yet acquired.

For example, the accumulation means 58 may refer to the reward information of the enemy character information 50C and acquire drop items of the enemy characters accumulated in the player's accumulation information and drop items of the new enemy character. Then, the accumulation means 58 may refer to the acquired item information of the player information 50A, and if a drop item of the new enemy character is an item that the player has not yet acquired, and the drop items of the enemy characters accumulated in the accumulation information are items that the player has acquired, then the accumulation means 58 may delete the accumulated information about those enemy characters from the accumulation information and replace this with information about the new enemy character in the accumulation information.

Also, if the number of enemy characters accumulated in the accumulation information has reached a specific value, when a new enemy character is to be accumulated, the accumulation means 58 may prioritize enemy characters that the player has yet to encounter.

For example, the accumulation means 58 may refer to the encounter information of the player information 50A, and if the new enemy character is an enemy character that the player has yet to encounter and the enemy characters accumulated in the player's accumulation information are enemy characters that have been encountered by the player, it may delete the accumulated information about the enemy characters from the accumulation information and replace this with information about the new enemy character in the accumulation information.

Also, the accumulation means 58 may delete any enemy characters whose period of possible accumulation has expired from the player's accumulation information. For example, if the accumulation period of an enemy character accumulated in the accumulation information has exceeded the period of possible accumulation for that enemy character, the accumulation means 58 may delete information about that enemy character from the accumulation information. As an event (battle game) corresponding to enemy characters accumulated in the player's accumulation information is executed, the accumulation means 58 may delete information about those enemy characters from the accumulation information.

Also, the accumulation means 58 may accumulate one or more enemy characters selected by the selection means 56 as a single group in the player's accumulation information and limit the number of these groups to be accumulated to no greater than a specific value (such as 5). For example, if the number of groups accumulated in the player's accumulation information has reached a specific value, the accumulation means 58 may not accumulate a new group in the accumulation information.

Also, if the number of groups accumulated in the player's accumulation information has reached a specific value, when a new group selected by the selection means 56 is to be accumulated, the accumulation means 58 may prioritize groups having a large reward or groups including enemy characters with a lower frequency of appearance.

For example, the accumulation means 58 may refer to the reward information of the enemy character information 50C and acquire the experience values of the enemy characters included in the groups accumulated in the player's accumulation information and the experience values of the enemy characters included in the new group. Then, the accumulation means 58 may compare the total experience value of the enemy characters included in the groups accumulated in the accumulation information against the total experience value of the enemy characters included in the new group. If the total experience value of the enemy characters included in the new group is higher, the accumulation means 58 may delete information about the group having the lower total experience value from the accumulation information and replace this with information about the new group in the accumulation information.

Also, for example, the accumulation means 58 may refer to the reward information of the enemy character information 50C and acquire the amount of currency of the enemy characters included in the groups accumulated in the player's accumulation information and the amount of currency of the enemy characters included in the new group. Then, the accumulation means 58 may compare the total amount of currency of the enemy characters included in the groups accumulated in the accumulation information against the total amount of currency of the enemy characters included in the new group. If the total amount of currency of the enemy characters included in the new group is higher, the accumulation means 58 may delete information about the group having the lower total amount of currency from the accumulation information and replace this with information about the new group in the accumulation information.

Also, for example, the accumulation means 58 may refer to the appearance frequency of the enemy character information 50C and acquire the appearance frequency of the enemy characters included in the groups stored in the player's accumulation information and the appearance frequency of the enemy characters included in the new group. Then, the accumulation means 58 may compare the appearance frequency of the enemy character with the lowest appearance frequency included in the groups accumulated in the accumulation information against the appearance frequency of the enemy character with the lowest appearance frequency of the enemy characters included in the new group. If the appearance frequency of the enemy characters included in the new group is lower, the accumulation means 58 may delete information about the accumulated group from the accumulation information and replace this with information about the new group in the accumulation information.

Also, the accumulation means 58 may delete from the player's accumulation information any groups whose period of possible accumulation has elapsed. Here, a group may be associated with a period of possible accumulation according to the appearance frequency of the enemy characters included in the group. For example, the period of possible accumulation of a group may be the same as the period of possible accumulation of the enemy character with the lowest appearance frequency included in the group. In other words, the period of possible accumulation of a group may be the same as the period of possible accumulation of the enemy character having the shortest period of possible accumulation included in the group. For example, if the period of possible accumulation of the groups accumulated in the accumulation information exceeds the period of possible accumulation of this group, the accumulation means 58 may delete the enemy characters included in that group from the accumulation information. As an event (battle game) corresponding to the groups accumulated in the player's accumulation information is executed, the accumulation means 58 may delete those groups from the accumulation information.

The execution means 60 is a functional means for executing events. In one or more embodiments, the execution means 60 may execute events corresponding to the enemy characters accumulated in the player's accumulation information at the request of the player. For example, at the request of the player, the execution means 60 may execute an event in which an enemy character accumulated in the accumulation information is encountered. More specifically, the execution means 60 may execute a battle game against the enemy characters in response to a request from the player for battle with the enemy characters accumulated in the accumulation information.

Also, at the request of the player the execution means 60 may execute events corresponding to the groups accumulated in the player's accumulation information. For example, at the request of the player, the execution means 60 may execute an event in which a group accumulated in the player's accumulation information is encountered. More specifically, the execution means 60 may execute a battle game with a group accumulated in the accumulation information in response to a request from the player for battle with that group.

Also, the execution means 60 may give the player a reward related to the enemy characters accumulated in the player's accumulation information in response to the execution of the event. For example, if the player wins a battle game against enemy characters accumulated in the accumulation information, the execution means 60 may give the player a reward associated with those enemy characters. This reward may include, for example, experience value, currency, drop items, and the like.

Also, the execution means 60 may permit an event to be executed regardless of whether or not the player is moving. That is, the execution means 60 may permit the execution of a battle game regardless of whether or not the player is moving.

Also, the execution means 60 may restrict the execution of an event when the player is moving. That is, the execution means 60 may restrict (prohibit) the execution of a battle game when the player is moving. For example, the execution means 60 may refer to the position information history of the player information 50A and stop the execution of the battle game if it is detected that the player is moving.

Processing Flow Related to Accumulation

Figure 5:
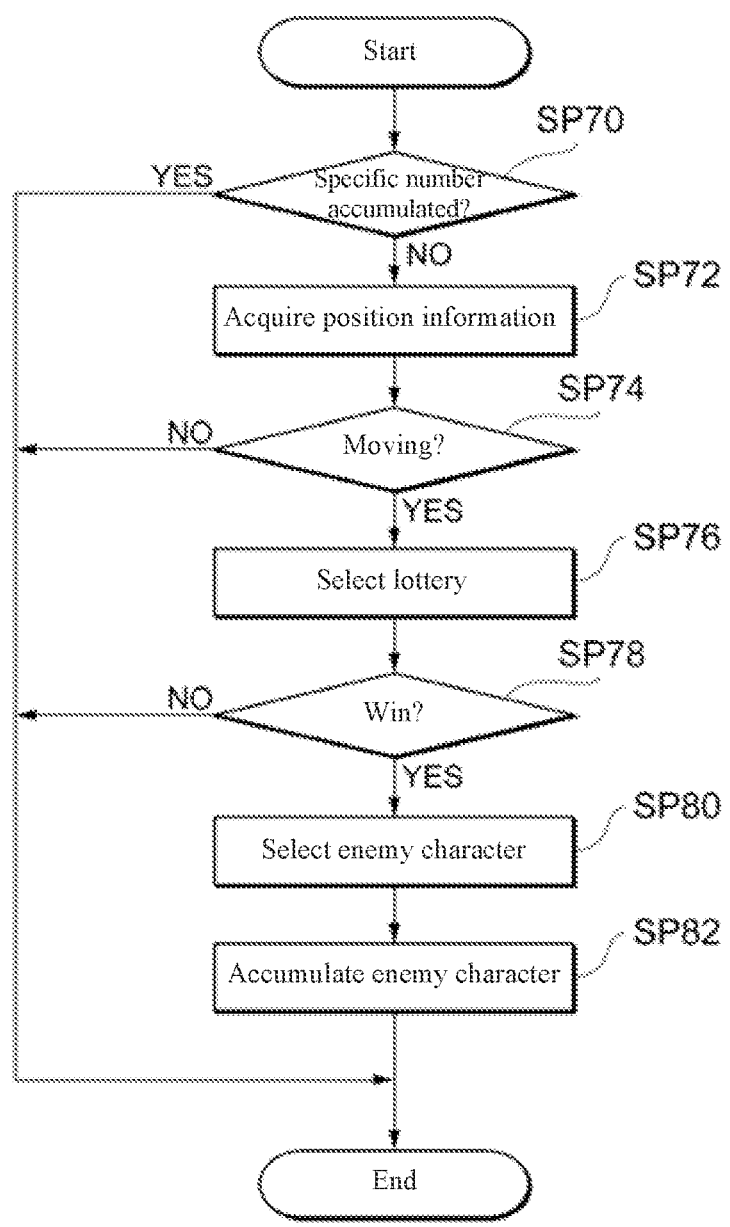
FIG. 5 is a flowchart showing an example of the processing flow for accumulating enemy characters appearing in a game field in the player's accumulation information in the game system according to one or more embodiments.

FIG. 5 is a flowchart showing an example of the processing flow for accumulating enemy characters appearing in the game field in the player's accumulation information, in a game system according to one or more embodiments. Also, the processing of the following steps is commenced whenever a specific length of time (such as 3 minutes) has elapsed while the player keeps the game running in the background, for example. The order and details of the following steps can be varied as needed.

Step SP70

The determination means 54 determines whether or not the number of enemy characters accumulated in the player's accumulation information has reached a specific value (such as 20). More specifically, the determination means 54 refers to the player information 50A and determines whether or not the number of character IDs of the enemy characters accumulated in the accumulation information has reached 20. If the determination is positive, the processing series shown in FIG. 5 is ended. On the other hand, if the determination is negative, the processing proceeds to step SP72.

Step SP72

The acquisition means 52 acquires the position information about the player. For example, the acquisition means 52 acquires position information (latitude and longitude) about the terminal device 12 owned by the player from the GPS receiving unit 39. Then, the acquisition means 52 stores the acquisition time and position information in the position information history of the player information 50A. The processing then moves to step SP74.

Step SP74

The determination means 54 determines whether or not the player is moving. For example, the determination means 54 compares the position information history of the player information 50A with the position information acquired in step SP72, and determines whether or not the player is moving at a specific speed (such as 1 to 2 meters per second). If the determination is positive, the processing proceeds to step SP76. On the other hand, if the determination is negative, the processing series shown in FIG. 5 is ended.

Step SP76

The selection means 56 performs a lottery as to whether or not to select an enemy character, regardless of any request from the player. For example, the selection means 56 performs a lottery on the basis of the winning probability (such as 25%) of selecting an enemy character. The processing then proceeds to step SP78.

Step SP78

The determination means 54 determines whether or not the lottery in step SP76 was won. If the determination is positive, the processing proceeds to step SP80. On the other hand, if the determination is negative, the processing series shown in FIG. 5 is ended.

Step SP80

The selection means 56 selects one or more enemy characters from a plurality of types of enemy character on the basis of their appearance frequency, regardless of any request from the player. For example, the selection means 56 selects one to five enemy characters from a plurality of types of enemy character appearing in the game field in the quest being executed by the player. The processing then proceeds to step SP82.

Step SP82

The accumulation means 58 accumulates information about one or more enemy characters selected in step SP80 in the player's accumulation information. More specifically, the accumulation means 58 accumulates the selected one or more enemy characters (character IDs) as a single group in the accumulation information of the player information 50A. Also, the accumulation means 58 accumulates (stores) the position information acquired by the acquisition means 52 in step SP72 in the accumulation information as the appearance position of the enemy character(s). The accumulation means 58 permits (allows) the number of enemy characters accumulated in the player's accumulation information as a result of this accumulation to exceed a specific value (such as 20). The processing series shown in FIG. 5 is then ended.

Processing Flow Related to Event Execution

Figure 6:
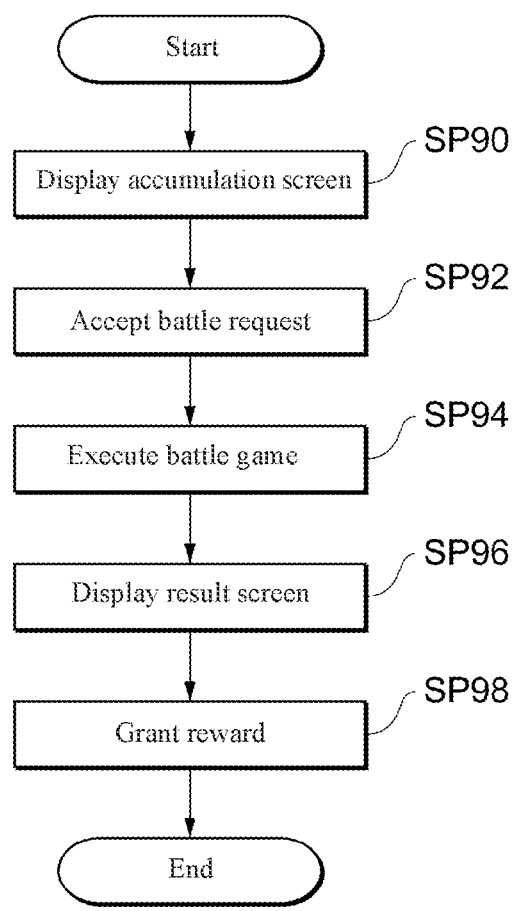
FIG. 6 is a flowchart showing an example of the processing flow for executing an event in the game system according to one or more embodiments.

FIG. 6 is a flowchart showing an example of the processing flow for executing an event in the game system according to one or more embodiments. The processing of the following steps is commenced, for example, at the point when the confirmation menu for confirming the enemy characters accumulated by the player is displayed on the touch panel 32. Also, during the processing of the following steps, the execution means 60 may restrict (stop) the execution of the event if it is detected that the player is moving. The order and details of the following steps can be varied as needed.

Step SP90

The execution means 60 displays an accumulation screen 70, which shows the group of enemy characters accumulated in the player's accumulation information, on the touch panel 32.

Figure 7:
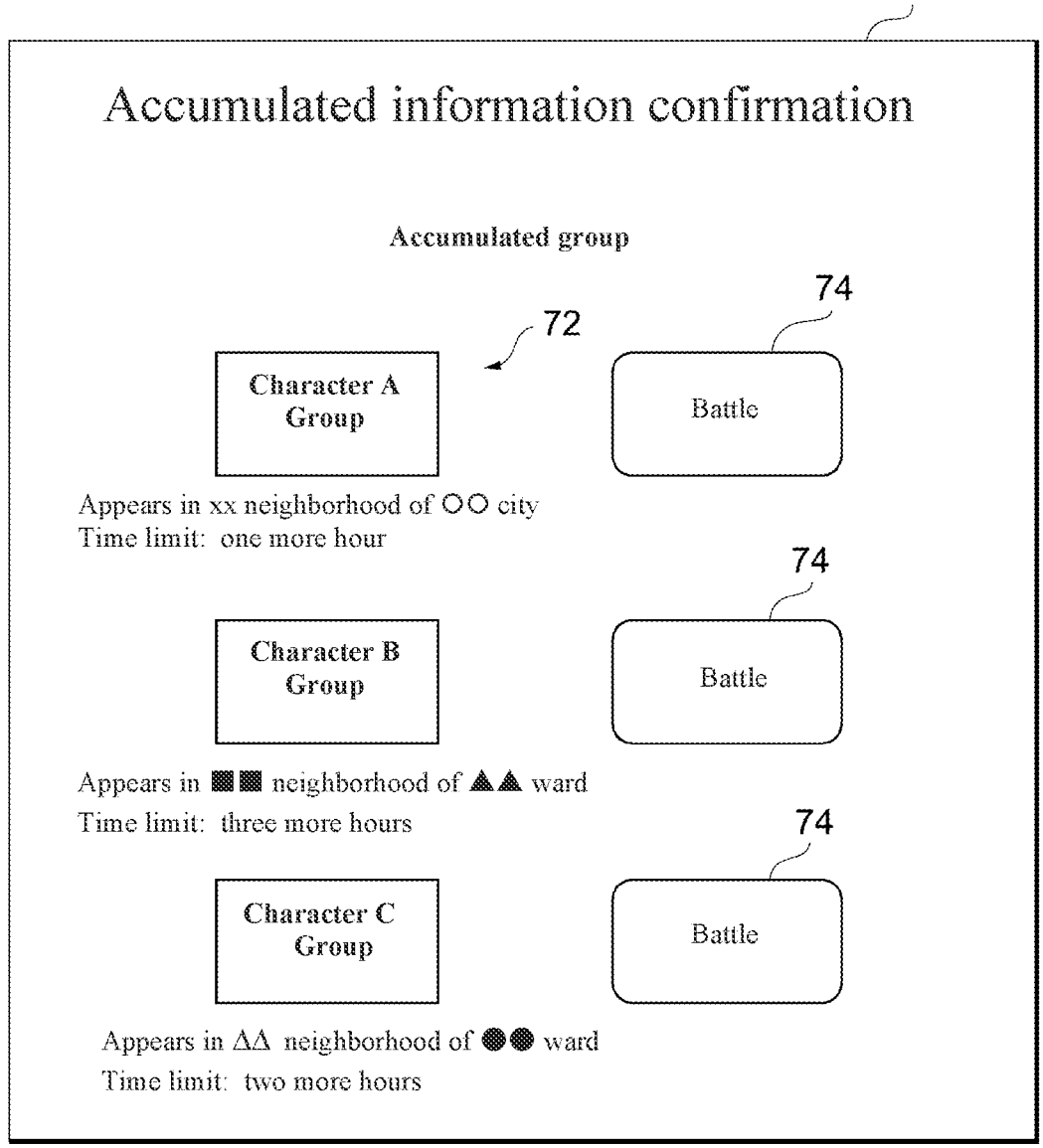
FIG. 7 is a diagram showing an example of an accumulation screen according to one or more embodiments.

FIG. 7 is a diagram showing an example of the accumulation screen 70 according to one or more embodiments.

As shown in FIG. 7, the accumulation screen 70 is provided with a group information area 72 and a battle button 74. The group information area 72 is used to show the accumulated group of enemy characters, the appearance position of that group, and the remaining period (time limit) to be accumulated. The appearance position is the position in the real world where the enemy characters (group) appear, and is shown in a format converted from latitude and longitude to an address, for example. The remaining period is, for example, the time period obtained by subtracting the elapsed period since the accumulation of the group from the period of possible accumulation for the group. The battle button 74 is a button for issuing an instruction to battle against an associated group.

Returning to FIG. 6, the processing moves to step SP92.

Step SP92

The execution means 60 accepts a request from the player to battle a group of enemy characters. More specifically, the execution means 60 accepts the pressing of the battle button by the player. The processing then moves to step SP94.

Step SP94

Upon accepting the pressing of the battle button by the player, the execution means 60 executes a battle game (event) against one or more enemy characters included in the group associated with the battle button. More specifically, the execution means 60 executes a battle game on the basis of ability information about the player character and ability information about one or more enemy characters, and the player wins when the hit points of each of the enemy characters drops to zero or less. Then, the execution means 60 determines the reward to be given when the player has defeated the enemy characters, that is, when the battle game has been cleared. For example, the execution means 60 determines that the player character used in the battle game will be given the experience value associated with the enemy characters that the player has played against. Also, for example, the execution means 60 determines a reward for the player in the amount of currency associated with the enemy characters who played against the player. Also, for example, the execution means 60 determines a reward of drop items according to the drop rate associated with the enemy characters who played against the player. The accumulation means 58 deletes the group associated with this battle button from the player's accumulation information as the battle game is executed. The processing then moves to step SP96.

Step SP96

When the player wins a battle game, the execution means 60 displays a battle result screen 80, which indicates that the enemy characters have been defeated, on the touch panel 32.

Figure 8:
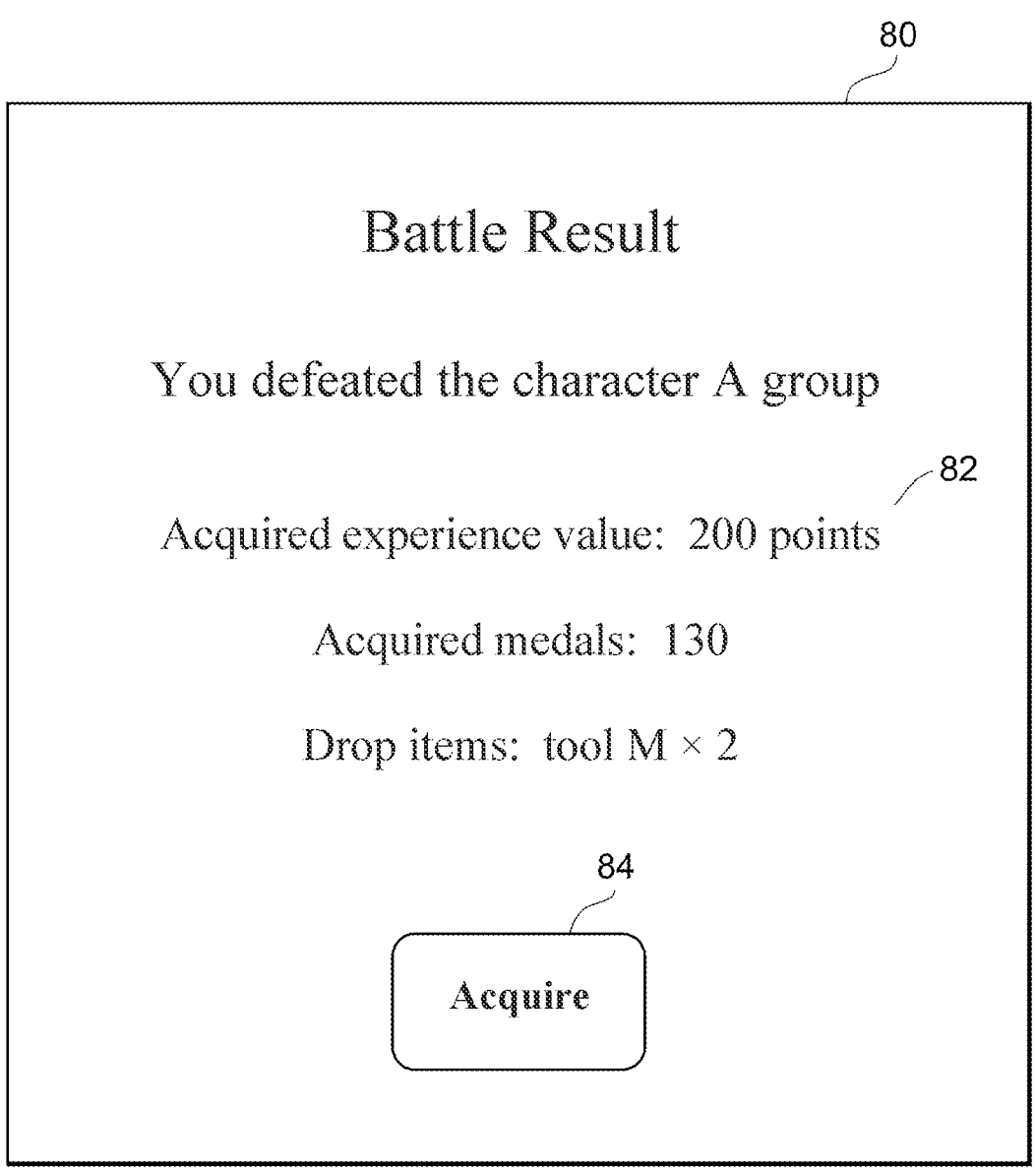
FIG. 8 is a diagram showing an example of a battle result screen according to one or more embodiments.

FIG. 8 is a diagram showing an example of the battle result screen 80 according to one or more embodiments.

As shown in FIG. 8, the battle result screen 80 is provided with a reward information area 82 and an acquisition button 84. The reward information area 82 is used to show the reward given to the player for winning a battle game. The acquisition button 84 is a button for issuing an instruction to acquire a reward.

Returning to FIG. 6, the processing moves to step SP98.

Step SP98

The execution means 60 grants the reward determined in step SP94 to the player. The processing series shown in FIG. 6 is then ended.

Effect

As described above, in one or more embodiments, a computer is made to function as the acquisition means 52 for acquiring the position information about the player in the real world; the determination means 54 for determining whether or not a specific condition related to the movement or position of the player has been satisfied on the basis of the position information; the selection means 56 for selecting one or more sets of content from a plurality of types of content on the basis of appearance frequency, regardless of any request from the player, in the event that the determination is positive; the accumulation means 58 for accumulating selected content in the accumulation information associated with the player; and the execution means 60 for executing an event corresponding to the accumulated content at the request of the player, wherein the execution means 60 grants the player rewards related to the accumulated content in response to the execution of the event.

With this configuration, because one or more sets of content are automatically accumulated depending on the movement or position of the player and an event corresponding to the accumulated content is executed at a request from the player, it is possible to provide a game that can be played safely and that reflects the movement or position of the player without risk of the player losing interest in the game. Also, because the player can play an event corresponding to content accumulated over time at home or the like, the game manager can set up an event of a level of difficulty that will take some time to play, making the game more engaging.

Also, in one or more embodiments, the selection means 56 may select content on the basis of position information.

With this configuration, because content is accumulated on the basis of position information about the player, the game is more fun because it reflects the position of the player.

Also, in one or more embodiments, the execution means 60 may permit the execution of an event regardless of whether or not the player is moving.

With this configuration, the player can execute an event corresponding to accumulated content even when the player is not moving, so a greater safety can be provided while playing.

Also, in one or more embodiments, the execution means 60 may restrict the execution of an event when the player is moving.

With this configuration, the player cannot execute an event corresponding to accumulated content when the player is in a moving state, so greater safety can be provided while playing.

Also, in one or more embodiments, the accumulation means 58 may limit the number of sets of content accumulated in the accumulation information to no greater than a specific value.

With this configuration, because the number of sets of accumulated content is limited, the player can be encouraged to play an event corresponding to the accumulated content, which makes the game more engaging.

Also, in one or more embodiments, when the number of sets of content accumulated in the accumulation information reaches a specific value and new content is accumulated, the accumulation means 58 may prioritize content with a greater reward or a lower frequency of appearance.

With this configuration, because content that is advantageous to the player is preferentially accumulated, the player will be more motivated to play the event corresponding to the content, which makes the game more engaging.

Also, in one or more embodiments, if the number of sets of content accumulated in the accumulation information has reached a specific value, when new content is to be accumulated, the accumulation means 58 may prioritize content associated with a reward that the player has not yet acquired.

With this configuration, content associated with a reward that the player has not yet acquired is preferentially accumulated, so the player can be motivated to play the event corresponding to that content, which makes the game more engaging.

Also, in one or more embodiments, the execution means 60 may execute an event in which the player encounters the accumulated content, and if the number of sets of content accumulated in the accumulation information has reached a specific value, when new content is to be accumulated, the accumulation means 58 may prioritize content that the player has not yet encountered.

With this configuration, because content that the player has not yet encountered is preferentially accumulated, the player can be motivated to play an event in which that content is encountered, which makes the game more engaging.

Also, in one or more embodiments, the content may be associated with a period of possible accumulation according to the appearance frequency of that content, and the accumulation means 58 deletes any content whose period of possible accumulation has elapsed from the accumulation information.

With this configuration, because the period of possible accumulation is associated with the appearance frequency of the content, the player can be encouraged to execute the event corresponding to the content, which makes the game more engaging.

Also, in one or more embodiments, the accumulation means 58 may accumulate one or more selected sets of content as a single group in the accumulation information and limit the number of groups that are accumulated to no greater than a specific value, and the execution means 60 may execute an event corresponding to the group accumulated in the player's accumulation information at the request of the player.

With this configuration, because the number of accumulated groups is limited, the player can be encouraged to play an event corresponding to an accumulated group, which makes the game more engaging.

Also, in one or more embodiments, if the number of groups accumulated in the accumulation information has reached a specific value, when a new group is to be accumulated, the accumulation means 58 may prioritize groups including content with a greater reward or with a lower frequency of appearance.

With this configuration, because groups that are advantageous to the player are preferentially accumulated, the player can be motived to play events corresponding to these groups, which makes the game more engaging.

Also, in one or more embodiments, a group may be associated with a period of possible accumulation according to the appearance frequency of the content included in that group, and the accumulation means 58 may delete from the accumulation information any groups whose period of possible accumulation has elapsed.

With this configuration, because a group is associated with a period of possible accumulation according to the appearance frequency of the content included in the group, the player can be encouraged to execute an event corresponding to that group, which makes the game more engaging.

Also, in one or more embodiments, the specific condition can be that the player must be moving.

With this configuration, because the content is automatically accumulated as a result of the movement of the player, it is possible to provide a game that can be played safely and that reflects the movement of the player without risk of the player losing interest in the game.

Also, in one or more embodiments, the specific condition can be that the player must have moved a specific distance.

With this configuration, because the content is automatically accumulated according to the movement distance of the player, it is possible to provide a game that can be played safely and that reflects the movement distance of the player without risk of the player losing interest in the game.

Also, in one or more embodiments, the specific condition can be that the position information must be in the vicinity of a specific position.

With this configuration, because the content is automatically accumulated depending on the position of the player, it is possible to provide a game that can be played safely and that reflects the position of the player without risk of the player losing interest in the game.

Second Example

A second example will now be described.

The second example differs from the first example in that the selection means 56 selects an event, that the accumulation means 58 accumulates selected events, that the execution means 60 executes the accumulated events, and so on.

Any components and functions of the game system according to the second example that are not described below are the same as the components and functions of the game system according to the first example.

The storage means 50 stores event information. Event information is stored in association with the event ID of the event for each event. This event information may include, for example, the name and appearance frequency of the event, the appearance area, appearance character information, the period of possible accumulation, reward information, and so forth. The appearance frequency includes a numerical value according to the frequency with which an event appears in the game field. The appearance area includes the real-world area (range) where the event appears. The appearance character information includes the character IDs of the various characters appearing in an event. The appearance character information may include, for example, the character ID of one or more enemy characters. When an event appears, the period of possible accumulation includes the period (time limit) during which that event can be accumulated in the accumulation information of the player information 50A. For example, this period of possible accumulation is associated with a period that is longer in proportion to appearance frequency, and is associated with a period that is shorter in proportion to appearance frequency. The reward information includes experience value, amount of currency, and granted item information. The granted item information includes the item IDs of granted items, and the granting rate. The granting rate is the probability that a granted item will be granted to the player as a reward.

The encounter information of the player information 50A includes the event IDs of events that have been encountered, and event IDs of events that have not yet been encountered.

The accumulation information of the player information 50A includes an appearance position and an accumulation period, in association with the event ID of each event that appears (is encountered) in the game field. No more than a specific number (such as 5) of events (event IDs) can be accumulated in this accumulation information. The appearance position includes position information (latitude and longitude) about the real world where the event appeared. The accumulation period includes the elapsed period (elapsed time) since the event ID of the event was accumulated (stored).

The quest information 50D includes event appearance information. The event appearance information includes event IDs of various events that appear in the game field during quest execution.

Also, in one or more embodiments, the selection means 56 may select one or more events from a plurality of types of event on the basis of the appearance frequency, regardless of any request from the player, in the event that the determination by the determination means 54 is positive. For example, if the player has moved a specific distance, the selection means 56 may automatically select one or more events on the basis of the appearance frequency of a plurality of types of event appearing in the quest being executed by the player. More specifically, the selection means 56 may refer to the player information 50A and the quest information 50D and acquire the event appearance information associated with the quest ID of the quest being executed by the player. Then, the selection means 56 may refer to the event information and acquire the appearance frequency of each event that appears in the game field included in this acquired event appearance information. Then, the selection means 56 may divide the appearance frequency of each event by the total appearance frequency of the events to calculate the appearance probability of each event. The selection means 56 may then randomly select one or more events according to this appearance probability.

Also, in one or more embodiments, the accumulation means 58 may accumulate one or more events selected by the selection means 56 in the accumulation information associated with the player. For example, the accumulation means 58 may accumulate (store) the event IDs of one or more selected events in the accumulation information.

Also, the accumulation means 58 may limit the number of events accumulated in the player's accumulation information to no more than a specific value (such as 5). For example, if the number of events accumulated in the accumulation information has reached the specific value, the accumulation means 58 will not accumulate any new events in the accumulation information.

Also, if the number of events accumulated in the player's accumulation information has reached the specific value, when a new event selected by the selection means 56 is to be accumulated, the accumulation means 58 may prioritize events with a greater reward or with a lower frequency of appearance.

For example, the accumulation means 58 may refer to the reward information of the event information and acquire the experience values of the events accumulated in the player's accumulation information and the experience value of a new event. Then, the accumulation means 58 may compare the experience value of the event with the lowest experience value among the events accumulated in the accumulation information against the experience value of the new event. If the experience value of the new event is higher, the accumulation means 58 may delete the information about the event having the lowest experience value from the accumulation information and replace this with information about the new event in the accumulation information.

Also, for example, the accumulation means 58 may refer to the reward information of the event information and acquire the amount of currency of the events accumulated in the player's accumulation information and the amount of currency of the new event. Then, the accumulation means 58 may compare the amount of currency of the event with the lowest amount of currency among the events accumulated in the accumulation information against the amount of currency of the new event. If the amount of currency of the new event is higher, the accumulation means 58 may delete the information about the event having the lowest amount of currency from the accumulation information and replace this with information about the new event in the accumulation information.

Also, for example, the accumulation means 58 may refer to the appearance frequency of the event information and acquire the appearance frequency of the event accumulated in the player's accumulation information and the appearance frequency of a new event. Then, the accumulation means 58 may compare the appearance frequency of the event with the highest appearance frequency among the events accumulated in the accumulation information against the appearance frequency of the new event. If the appearance frequency of the new event is lower, the accumulation means 58 may delete the information about the event having the highest appearance frequency from the accumulation information and replace this with information about the new event in the accumulation information.

Also, if the number of events accumulated in the player's accumulation information has reached a specific value, when a new event selected by the selection means 56 is to be accumulated, the accumulation means 58 may prioritize events associated with a reward that the player has not yet acquired.

For example, the accumulation means 58 may refer to the reward information of the event information and acquire the granted items for each event accumulated in the player's accumulation information and the granted items for the new event. Then, the accumulation means 58 may refer to the acquired item information of the player information 50A, and if the granted item of the new event is an item that the player has not yet acquired and the granted item of an event accumulated in the accumulation information is an item that the player has acquired, it may delete that accumulated event from the accumulation information and replace this with the new event in the accumulation information.

Also, if the number of events accumulated in the player's accumulation information has reached a specific value, when a new event selected by the selection means 56 is to be accumulated, the accumulation means 58 may prioritize events that have not yet been encountered by the player.

For example, the accumulation means 58 may refer to the encounter information of the player information 50A, and if the new event is an event that the player has not yet encountered and an event accumulated in the player's accumulation information is an event that the player has encountered, it may delete information about that accumulated event from the accumulation information and replace this with information about the new event in the accumulation information.

Also, the accumulation means 58 may delete any events for which the period of possible accumulation has elapsed from the player's accumulation information. For example, if the period of possible accumulation of an event accumulated in the accumulation information exceeds the period of possible accumulation of that event, the accumulation means 58 may delete that event from the accumulation information. The accumulation means 58 may delete an event (battle game) accumulated in the player's accumulation information from the accumulation information as that event is executed.

Also, in one or more embodiments, the execution means 60 may execute events accumulated in the player's accumulation information at the request of the player. For example, in response to a request from the player to execute the event accumulated in the accumulation information, the execution means 60 may execute an event in which an appearance character related to that event is encountered. More specifically, the execution means 60 may execute a battle game against an appearance character related to an event accumulated in the accumulation information in response to a request from the player to execute that event.

Processing Flow Related to Accumulation

Figure 9:
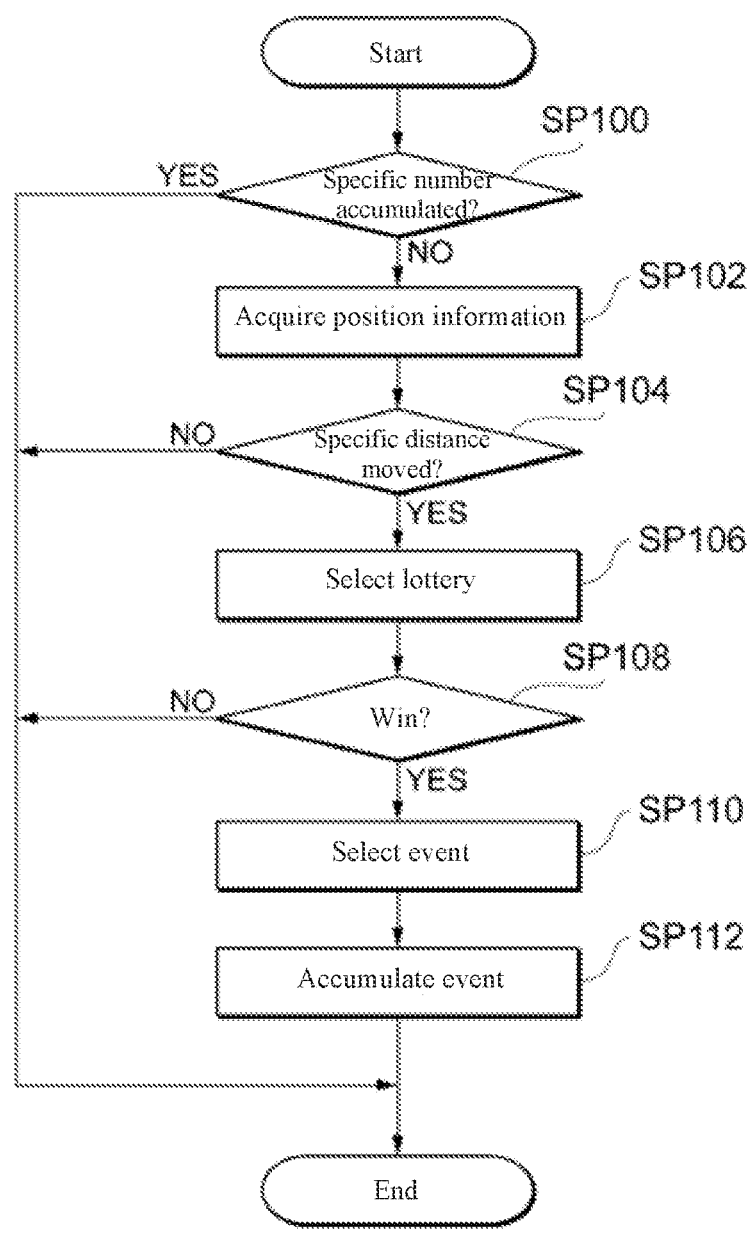
FIG. 9 is a flowchart showing an example of the processing flow for accumulating events appearing in a game field in player's accumulation information in the game system according to one or more embodiments.

FIG. 9 is a flowchart showing an example of the processing flow for accumulating events appearing in the game field in the player's accumulation information in the game system according to one or more embodiments. Also, the processing of the following steps is commenced whenever a specific length of time (such as 1 hour) has elapsed while the player keeps the game running in the background, for example. The order and details of the following steps can be varied as needed.

Step SP100

The determination means 54 determines whether or not the number of events accumulated in the player's accumulation information has reached a specific value (such as 5). More specifically, the determination means 54 refers to the player information 50A and determines whether or not the number of event IDs of the events accumulated in the accumulation information has reached 5. If the determination is positive, the processing series shown in FIG. 9 is ended. On the other hand, if the determination is negative, the processing proceeds to step SP102.

Step SP102

The acquisition means 52 acquires position information about the player. For example, the acquisition means 52 acquires position information (latitude and longitude) about the terminal device 12 owned by the player from the GPS receiving unit 39. Then, the acquisition means 52 stores the acquired time and position information in the position information history of the player information 50A. The processing then moves to step SP104.

Step SP104

The determination means 54 determines whether or not the player has moved a specific distance. For example, the determination means 54 refers to the position information history of the player information 50A and determines whether or not the movement distance of the player since a specific point of time (such as 1 hour before) has reached a specific distance (such as 5 km). If the determination is positive, the processing proceeds to step SP106. On the other hand, if the determination is negative, the processing series shown in FIG. 9 is ended.

Step SP106

The selection means 56 performs a lottery as to whether or not to select an event. For example, the selection means 56 performs a lottery on the basis of the probability (such as 70%) of selecting an event. The processing then moves to step SP108.

Step SP108

The determination means 54 determines whether or not the lottery in step SP106 has been won. If the determination is positive, the processing moves to step SP110. On the other hand, if the determination is negative, the processing series shown in FIG. 9 is ended.

Step SP110

The selection means 56 selects one or more events from a plurality of types of event on the basis of the appearance frequency, regardless of any request from the player. For example, the selection means 56 selects one or two events from the plurality of types of event appearing in the game field in the quest being executed by the player. The processing then moves to step SP112.

Step SP112

The accumulation means 58 accumulates information about the one or more events selected in step SP110 in the player's accumulation information. More specifically, the accumulation means 58 accumulates one or more selected events (event IDs) in the accumulation information of the player information 50A. Also, the accumulation means 58 accumulates (stores) the position information acquired by the acquisition means 52 in step SP100 in the accumulation information as the appearance positions of those events. The accumulation means 58 permits the number of events accumulated in the accumulation information to exceed a specific value (such as 5) due to this accumulation. The processing series shown in FIG. 9 is then ended.

Processing Flow Related to Event Execution

Figure 10:
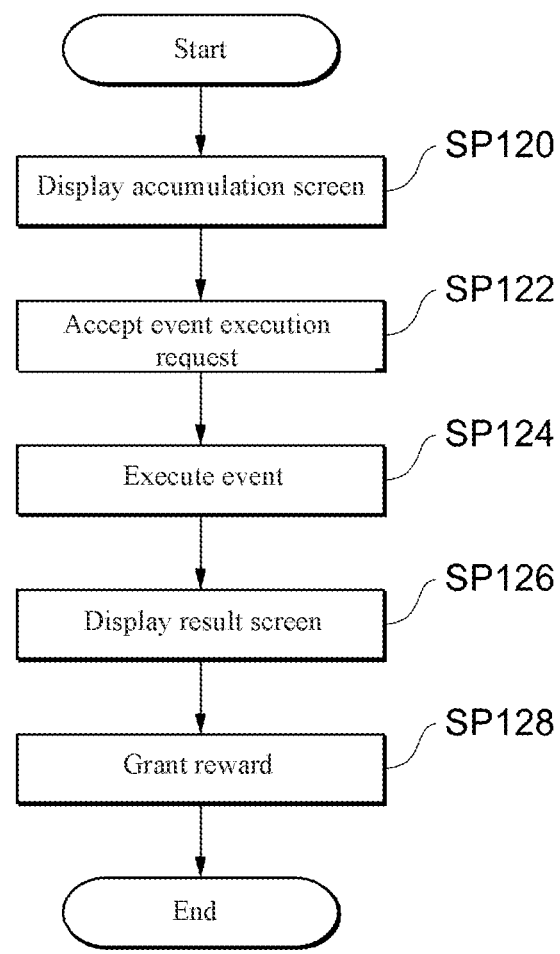
FIG. 10 is a flowchart showing an example of the processing flow for executing an event in the game system according to one or more embodiments.

FIG. 10 is a flowchart showing an example of the processing flow for executing an event in the game system according to one or more embodiments. Also, the processing of the following steps is commenced, for example, at the point when the confirmation menu for confirming the events accumulated by the player is displayed on the touch panel 32. Also, during the processing of the following steps, the execution means 60 may restrict (halt) the execution of an event when it is detected that the player is moving. The order and details of the following steps can be varied as needed.

Step SP120

The execution means 60 displays the accumulation screen 90, which shows the events accumulated in the player's accumulation information, on the touch panel 32.

Figure 11:
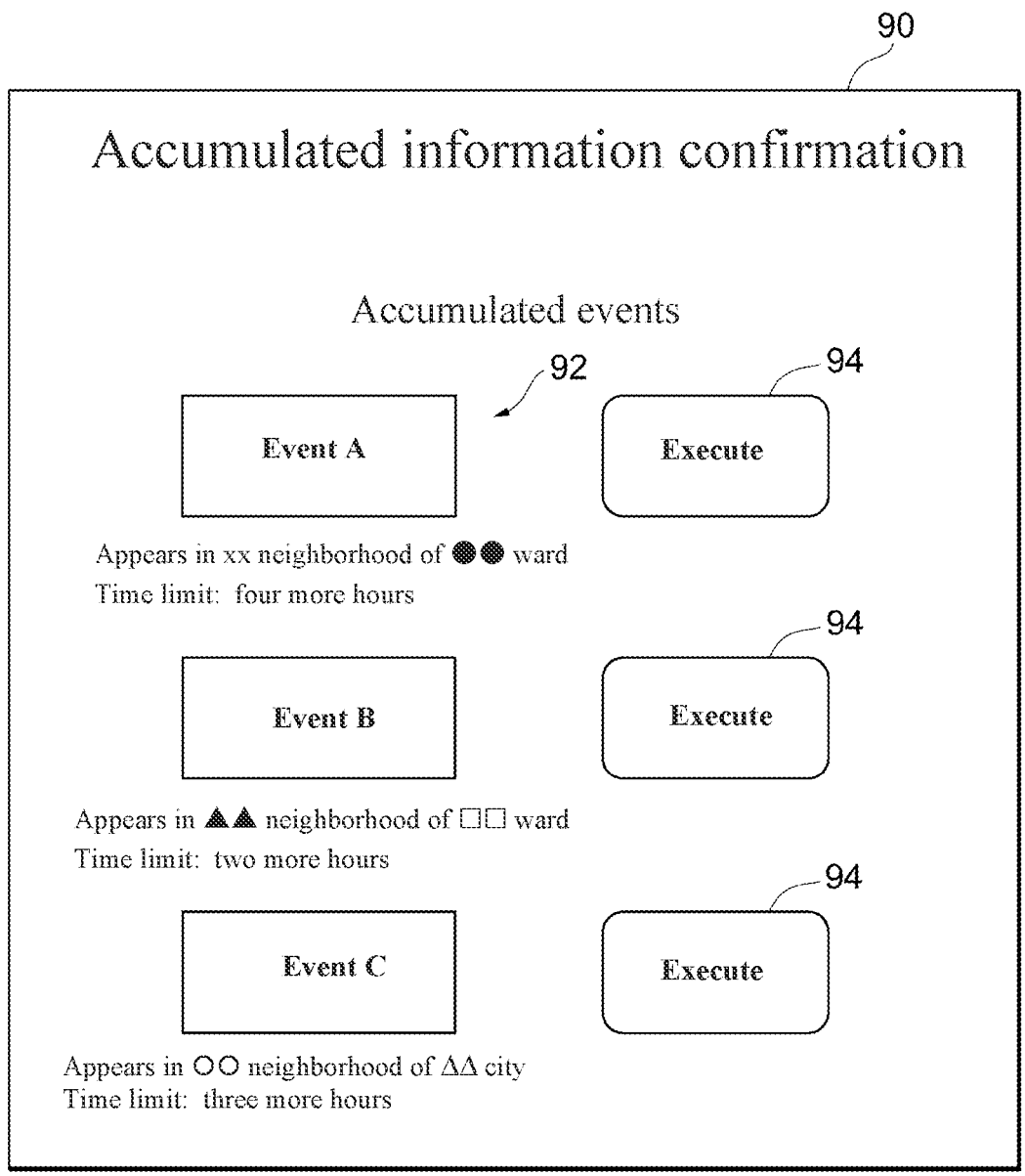
FIG. 11 is a diagram showing an example of an accumulation screen according to one or more embodiments.

FIG. 11 is a diagram showing an example of the accumulation screen 90 according to one or more embodiments.

As shown in FIG. 11, the accumulation screen 90 is provided with an event information area 92 and an execution button 94. The event information area 92 shows accumulated events, the appearance positions of those events, and the remaining period (time limit) for accumulation. This appearance position is the position in the real world where an event appears, and is shown in a format converted from latitude and longitude to an address, for example. The execution button 94 is a button for issuing an instruction to execute an associated event.

Returning to FIG. 10, the processing moves to step SP122.

Step SP122

The execution means 60 accepts a request from the player to execute an event. More specifically, the execution means 60 accepts the pressing of the execution button by the player. The processing then moves to step SP124.

Step SP124

Upon accepting the pressing of the execution button by the player, the execution means 60 executes the event associated with that execution button. For example, the execution means 60 refers to the appearance character information in the event information and executes a battle game against one or more enemy characters included in the appearance character information. If the player has won the battle game, that is, if the event has been cleared, the execution means 60 decides to grant the reward associated with the event. The accumulation means 58 deletes information about that event from the player's accumulation information as the event (battle game) is executed. The processing then moves to step SP126.

Step SP126

When the player clears an event, the execution means 60 displays the event result screen 100, which indicates that the event has been cleared, on the touch panel 32.

Figure 12:
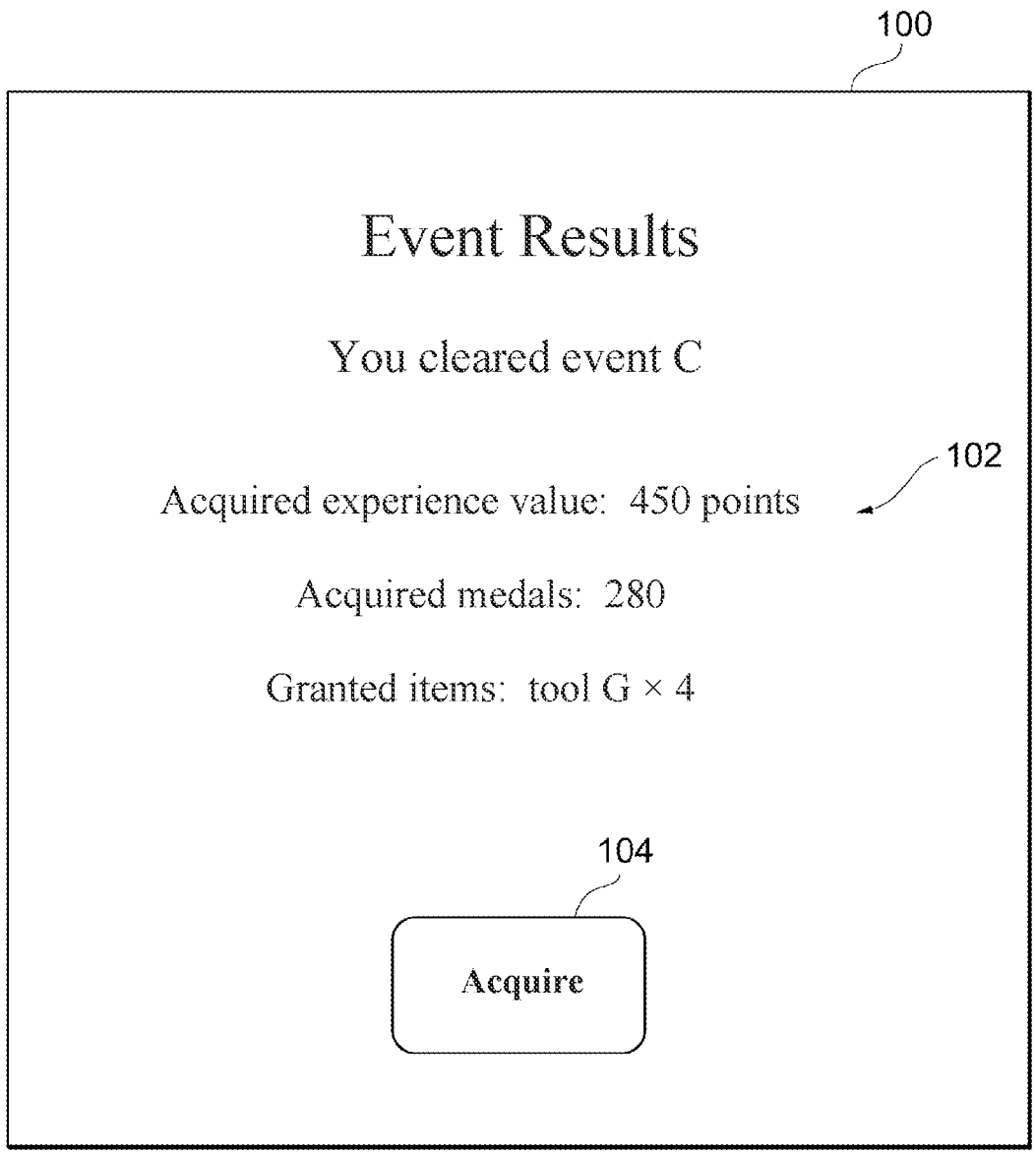
FIG. 12 is a diagram showing an example of an event result screen according to one or more embodiments.

FIG. 12 is a diagram showing an example of the event result screen 100 according to one or more embodiments.

As shown in FIG. 12, the event result screen 100 is provided with a reward information area 102 and an acquisition button 104. The reward information area 102 shows the reward granted to the player for clearing an event. The acquisition button 104 is a button for issuing an instruction to acquire a reward.

Returning to FIG. 10, the processing moves to step SP128.

Step SP128

The execution means 60 grants to the player the reward determined to be granted in step SP124. The processing series shown in FIG. 10 is then ended.

Effect

As described above, in one or more embodiments, a computer is made to function as: the acquisition means 52 for acquiring position information about the player in the real world; the determination means 54 for determining whether or not a specific condition related to the movement or position of the player has been satisfied on the basis of position information; the selection means 56 for selecting one or more events from a plurality of types of event on the basis of the appearance frequency, regardless of any request from the player, in the event that the determination is positive; the accumulation means 58 for accumulating selected events in the accumulation information associated with the player; and the execution means 60 for executing the accumulated events at the request of the player, wherein the execution means 60 grants the player the reward related to an event in response to the execution of that event.

With this configuration, because one or more events are automatically accumulated depending on the movement or position of the player and the accumulated events are executed at the request of the player, it is possible to provide a game that can be played safely and that reflects the movement or position of the player without risk of the player losing interest in the game. Also, because the player can play events accumulated over time at home or the like, the game manager can set up an event of a level of difficulty that will take some time to play, for example, which makes the game more engaging.

Also, in one or more embodiments, the selection means 56 may select an event on the basis of position information.

With this configuration, because the events are accumulated on the basis of position information about the player, the game is more interesting because it reflects the position of the player.

Also, in one or more embodiments, the execution means 60 may permit the execution of an event regardless of whether or not the player is moving.

With this configuration, the player can execute accumulated events even when the player is not moving, so a game that can be played safely can be provided.

Also, in one or more embodiments, the execution means 60 may restrict the execution of the event when the player is moving.

With this configuration, the player can only execute an accumulated event if the player is not moving, so a game that can be played safely can be provided.

Also, in one or more embodiments, the accumulation means 58 may limit the number of events accumulated in the accumulation information to a specific value or less.

With this configuration, because the number of accumulated events is limited, the player can be encouraged to play the accumulated events, which makes the game more engaging.

Also, in one or more embodiments, if the number of events accumulated in the accumulation information has reached a specific value, when a new event is to be accumulated, the accumulation means 58 prioritizes events with a greater reward or a lower frequency of appearance.

With this configuration, because events that are advantageous to the player are preferentially accumulated, the player will be more motivated to play those events, which makes the game more engaging.

Also, in one or more embodiments, if the number of events accumulated in the accumulation information has reached a specific value, when a new event is to be accumulated, the accumulation means 58 prioritizes events associated with a reward that the player has not yet acquired.

With this configuration, events associated with rewards that the player has not yet acquired are preferentially accumulated, so the player can be motivated to play the event corresponding to the content, which makes the game more engaging.

Also, in one or more embodiments, if the number of events accumulated in the accumulation information has reached a specific value, when a new event is to be accumulated, the accumulation means 58 may prioritize events that the player has not yet encountered.

With this configuration, because events that the player has not yet encountered are preferentially accumulated, the player can be motivated to play those events, which makes the game more engaging.

Also, in one or more embodiments, an event may be associated with a period of possible accumulation according to the appearance frequency of that event, and the accumulation means 58 may delete events for which the period of possible accumulation has elapsed from the accumulation information.

With this configuration, because an event is associated with the period of possible accumulation according to the appearance frequency of that event, the player can be encouraged to execute that event, which makes the game more engaging.

Also, in one or more embodiments, the specific condition can be that the player must be moving.

With this configuration, because events are automatically accumulated as a result of movement by the player, it is possible to provide a game that can be played safely and that reflects the movement of the player without risk of the player losing interest in the game.

Also, in one or more embodiments, the specific condition can be that the player must have moved a specific distance.

With this configuration, because events are automatically accumulated depending on the movement distance of the player, it is possible to provide a game that can be played safely and that reflects the movement distance of the player without risk of the player losing interest in the game.

Also, in one or more embodiments, the specific condition can be that the position information must be in the vicinity of a specific position.

With this configuration, because events are automatically accumulated depending on the position of the player, it is possible to provide a game that can be played safely and that reflects the position of the player without risk of the player losing interest in the game.

Modification Example

The present invention is not limited to or by the specific examples given above. Specifically, even if a person skilled in the art were to make appropriate design changes to the above embodiments, these would also be included in the scope of the present invention so long as it had the features of the present invention. Also, the elements included in the above embodiments and in the modification examples given below could be combined whenever technically possible, and such combinations would also be encompassed by the scope of the present invention so long as the features of the present invention are included.

For example, in the first example, a case was described in which the period of possible accumulation of a group was the same as the period of possible accumulation of the enemy character having the shortest period of possible accumulation included in that group, but it may instead be the same as the period of possible accumulation of the enemy character with the shortest period of possible accumulation included in the group, or it may be the average of the period of possible accumulations of the various enemy characters included in the group.

Also, in the first example, a case was described in which the accumulation means 58 accumulated the enemy characters (groups) selected by the selection means 56, but the points necessary in order to execute an event (battle game) corresponding to those enemy characters may instead be accumulated. For example, the accumulation means 58 may accumulate points related to the enemy characters selected by the selection means 56, and when the accumulated number of the points reaches a certain value (such as 100 points), the accumulation means 58 may accumulate those enemy characters in the accumulation information.

Also, in the second example, a case was described in which the accumulation means 58 accumulated events selected by the selection means 56, but the points necessary to execute an event (battle game) may instead be accumulated. For example, the accumulation means 58 may accumulate points related to the event selected by the selection means 56, and when the accumulated number of points reaches a certain value (such as 100 points), the accumulation means 58 may accumulate that event in the accumulation information.

Also, in the first example and the second example, a case was described in which the accumulation means 58 limited the enemy characters (content) and events to be accumulated in the player's accumulation information to a specific number or less, but this specific number may be varied according to the progress of the player in the game. For example, this specific number may increase as the player's rank rises in the game. Also, this specific number may be increased by the use (consumption) of paid items or consumable items by the player.

Also, in the first example and the second example, a case was described in which the accumulation means 58 deleted enemy characters or events whose period of possible accumulation had elapsed from the player's accumulation information, but the period of possible accumulation may also be extended by the use (consumption) of paid items and consumable items by the player.

Also, in the first example and the second example, a case was described in which position information about the player was acquired by the GPS receiving unit 39, but the position information may instead be acquired on the basis of the radio wave strength with respect to the access point by the wireless LAN communication unit 38, or the like. The position information is not limited to latitude and longitude, and there are no particular restrictions so long as it is information that can specify the position of the player. Also, the acquisition means 52 may acquire movement information about the player on the basis of information about the orientation or inclination of the terminal device 12 produced by a gyro sensor or the like. Examples of this movement information include the number of steps taken by the player and the movement speed. For example, the determination means 54 may determine whether or not the player is moving at a specific speed, whether or not the player has moved a specific distance, whether or not the player has walked a specific number of steps, and so forth from a change in position information, the number of steps, or the moving speed. The selection means 56 may then select content or an event on the basis of the appearance frequency, regardless of any request from the player, in the event that the determination is positive.

Also, in the first example and the second example, a case was described in which the goal (victory) of the player was to reduce the hit points of an enemy character (monster) to 0 or less in a battle game, but the battle game may instead involve capturing enemy characters. Also, the event may be one that involves encountering characters that cooperate with the player character. Examples of this event include an event in which the player character's ability information (ability value, skill) is changed by an encounter between the player character and a cooperating character.

Also, in the first example and the second example, a case was mainly described in which the content was characters (enemy characters), but it may instead be weapons, armor, accessory items, cards, avatars, coins, points, and the like.

Other Examples

Other examples will now be described.

Patent Literature 1 discloses a technique related to a game in which the movement or position of a player in the real world is reflected in a virtual world. With a game such as this, the player sets (installs) a quest destination at a point in the real world, after which the quest can be played by moving to that destination.

However, the player had to set the destination manually each time a quest was to be played, which was bothersome.

One or more embodiments make it possible to provide instructions and an information processing device with which it is easier to set the destination of a quest.

The instructions according to one or more embodiments cause a computer to function as a storage means for storing a location registered in advance by the player, a setting means for setting the registered location as the destination of the quest, and a control means for executing events in the quest on the basis of the fact that the current position of the player is the destination.

Also, in one or more embodiments, the control means notifies the player to execute the event once the current position of the player has reached the destination.

Also, in one or more embodiments, the control means executes the event when the player responds to the notification.

Also, in one or more embodiments, if the location is the first location and the quest is the first quest, the storage means stores a second location that has been registered in advance by the player and is different from the first location, and the setting means sets the second location as the destination of the second quest, which is different from the first quest, in response to the first quest having been executed.

Also, in one or more embodiments, the second quest is the next quest following the first quest.

Also, in one or more embodiments, the second location is at least a specific distance away from the first location.

Also, in one or more embodiments, the first location corresponds to the schedule included in schedule information for the player.

Also, in one or more embodiments, the schedule information includes a first schedule and a second schedule that is subsequent to the first schedule, and the second location is included in the second schedule.

Also, the information processing device according to one or more embodiments comprises a storage means for storing locations registered in advance by the player, a setting means for setting the registered locations as quest destinations, and a control means for executing events of the quest once the current position of the player has reached the destination.

With one or more embodiments, it is easier to set quest destinations.

Game Overview

The game according to one or more embodiments is a position information game that reflects the real-world position and movement of the player in the game world. With this game, for example, when the player moves in the real world, the player character disposed in the game field (virtual world) also moves. This player character is one or more characters that can be used by the player in the game. The player issues instructions to the player character by performing an input operation or the like on the touch panel 32.

Also, the game according to one or more embodiments includes a field mode and an event mode. The field mode is a mode in which the player character moves in the game field. In the field mode, the player instructs the player character to equip itself with (attach or remove) an equipment item that is owned or to use (consume) a consumable item that is owned. Equipment items include, for example, weapons, armor, accessories, and the like. Examples of consumable items include tools for restoring hit points of player characters, tools for eliminating status abnormalities of player characters (such as paralysis, confusion), and tools for strengthening equipment items. In addition, the event mode is a mode in which the player moves in the real world, that is, the player character moves in the game field to carry out a battle game against enemy characters that appear (are encountered) in the game field or against boss characters that appear once the destination of the quest is reached. In this battle game, the player instructs the player character to attack, use skills, defend, use (consume) items, and so on. If the player defeats an enemy character, a reward is given to the player. This victory may be, for example, when the hit points of the enemy character have reduced to 0 or less. The reward may be, for example, experience value for growing (increasing the level of) a player character, currency (such as medals or coins) that can be used in the game, drop items (such as equipment items or consumable items), and so forth. For example, if an enemy character's ability is high or its appearance frequency is low, a large reward of experience value, currency, etc., may be given.

Also, the game according to one or more embodiments has a plurality of types of quests, each of which has a different name (title). Each quest can be selected by the player on the quest menu screen, etc. The player can clear the quest by defeating a boss character encountered at the destination (goal location) of the quest. Quests include normal quests and limited-time quests. A normal quest has a quest format in which the next quest can be selected (released) by clearing one quest that can be selected by the player. This next quest that can be selected is set to have a higher difficulty level than the current quest, for example, and the abilities of the enemy characters and boss characters are higher. A limited-time quest has a quest format in which quests that can be selected are switched depending on the time of day or a certain period of time. These quests are associated with enemy characters appearing in the game field and boss characters appearing at the destination of the quest.

Also, in the game according to one or more embodiments, the destination of each quest is set (installed) at a location in the player's real world, that is, a virtual location in the game field. Examples of this location include the player's home, workplace, or school, a commercial facility, a public facility, sightseeing spot, and the like. On the way to the destination of the quest, the player can encounter (battle) an enemy character according to the quest or the position information on the game field. The player can then encounter a boss character corresponding to that quest on the game field by moving to the vicinity of the location (such as within a radius of 20 meters) where the destination of the quest has been set.

Functional Means

Figure 13:
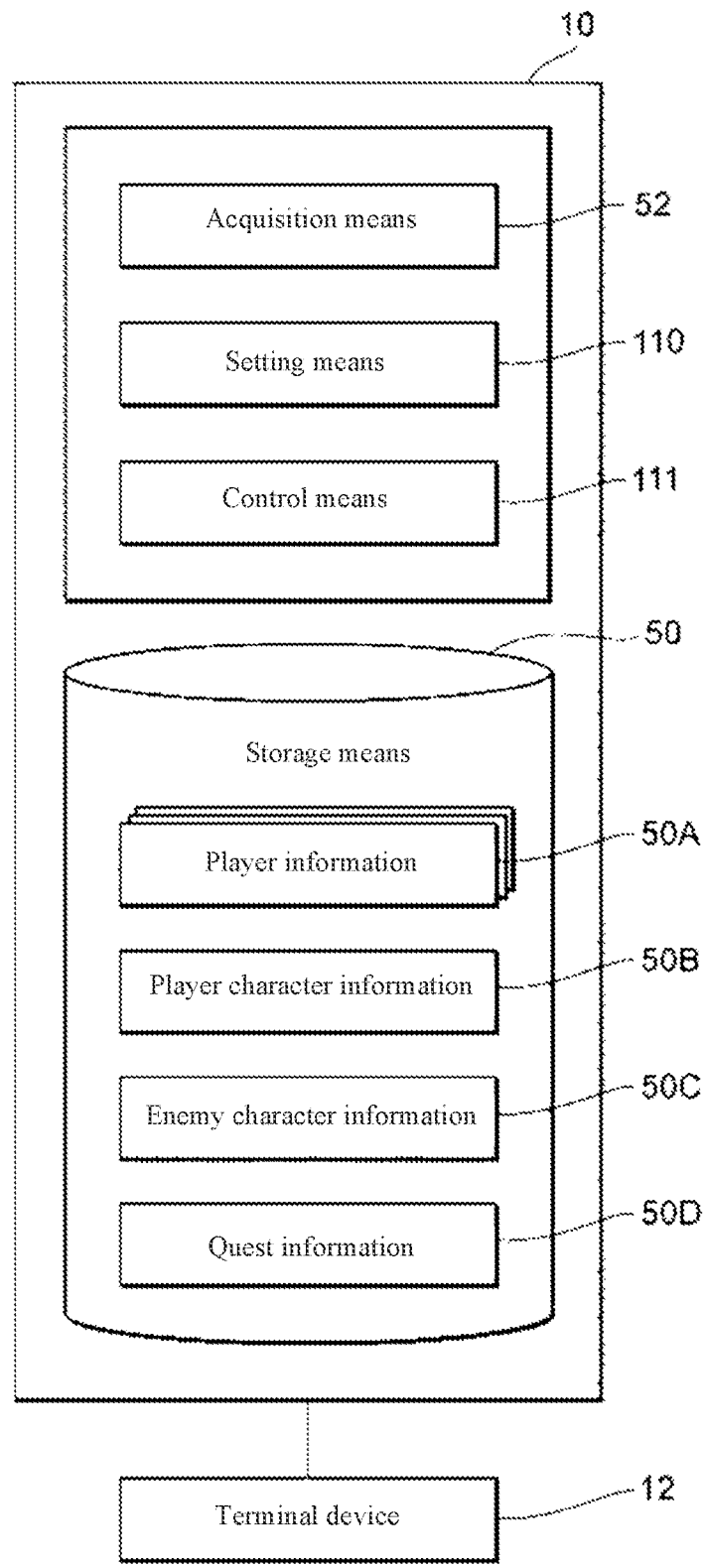
FIG. 13 is a block diagram showing an example of the functional configuration of a server device according to one or more embodiments.

FIG. 13 is a block diagram showing an example of the functional configuration of the server device 10.

As shown in FIG. 13, the server device 10 comprises a storage means 50, an acquisition means 52, a setting means 110, and a control means 111 as functional components. The storage means 50 is realized by one or more storage devices 28. Functional means other than the storage means 50 are realized by having the control device 20 execute the game program 14 stored in the storage device 28, etc.

The storage means 50 is a functional means for storing the player information 50A, the player character information 50B, the enemy character information 50C, the quest information 50D, and so forth.

The player information 50A is stored for each player in association with the player ID. The player information 50A may include, for example, the player's name and age, utilized character information, possessed item information, schedule information, and quest progress information. The utilized character information includes ability information associated with the character IDs of the characters that can be used by the player. Ability information includes ability values and skill information. The ability values include, for example, the total experience value (level), hit points, attack power, defense power, and so forth. The total experience value increases when experience value is gained in a battle against an enemy character. As the total experience value increases, the player character's level increases, hit points, attack power, and defense power increase, and new skills are learned. The skill information includes skill IDs for the skills that the player character has learned (can use). Examples of these skills include magic that restores the hit points of a player character, and a special move for attacking an enemy character with a fire attribute. The possessed item information includes the item IDs and quantity of items (equipment items and consumable items) owned by the player. Schedule information includes future schedules pre-registered by the player. The schedule information includes a schedule name (title), a start date and time, an end date and time, and a location associated with the schedule ID of each schedule. The location may include, for example, the place where the schedule is to be carried out. This information is registered, for example, when the player performs an input operation on the touch panel 32 during a game. For instance, in a first schedule, which is the nearest schedule, the schedule name is registered as "lunch," the start date and time as "12:00 noon on Apr. 1, 2020," the end date and time as "1:00 p.m. on Apr. 1, 2020," and the location as "Restaurant D" (first location), in association with the schedule ID of the first schedule. Also, for instance, in the second schedule, which is the next schedule after the first schedule, the schedule name is registered as "Beauty Salon," the start date and time as "7:00 p.m. on Apr. 1, 2020," the end date and time as "9:00 p.m. on Apr. 1, 2020," and the location as "Building E" (second location), in association with the schedule ID of the second schedule. Also, for instance, in the third schedule, which is the next schedule after the second schedule, the schedule name is registered as "return home," the start date and time as "10:00 p.m. on Apr. 1, 2020," the end date and time as "8:00 a.m. on Apr. 2, 2020," and the location as "Apartment F" (third location), in association with the schedule ID of the third schedule. The quest progress information includes selectable quest information and executed quest information. Selectable quest information includes quest IDs of normal quests and limited-time quests that can be selected by the player. For example, in the selectable quest information, the quest ID of the next normal quest is added by clearing the normal quest with the highest difficulty among the quests that the player can select. Also, for example, in the selectable quest information, the quest ID of a limited-time quest is replaced as time (period) passes. The execution quest information includes the destination in association with the quest ID of normal quests and limited-time quests executed (selected) by the player. The destination is a location in the real world.

The player character information 50B is stored for each player character in association with the character ID of that player character. This player character information 50B may include, for example, the name and image of the player character, the required experience value for each level, ability information according to the level, items that can be, and the like. The required experience value for each level includes the total experience value required to reach each level. Examples of ability information according to the level include the acquisition level for various skills, and the ability value (hit points, attack power, defense power, etc.) for each level. Items that can be equipped with include the item ID of equipment item that can be equipped with.

The enemy character information 50C is stored for each enemy character in association with the character ID of the enemy character. These enemy characters also include boss characters. The enemy character information 50C may include, for example, the name and image of the enemy character, the appearance frequency, the appearance area, ability information, reward information, and so forth. The appearance frequency includes a numerical value according to the frequency at which the enemy character appears in the game field. For instance, "50" may be set for the enemy character with the highest appearance frequency (lowest rarity), and "1" set for the enemy character with the lowest appearance frequency (highest rarity). The appearance area includes the real-world area (range) in which an enemy character appears. This area may be, for example, the range indicated by the latitude and longitude in the real world. The appearance area may also be an area (range) indicated by the coordinates of the game field. Ability information includes ability values and skill information. Reward information includes experience value, amount of currency, and drop item information. The drop item information includes the item IDs of drop items and the drop rate. The drop rate is the probability that a drop item will be awarded to the player as a reward.

The quest information 50D is stored for each quest in association with the quest ID for that quest. This quest information 50D may include, for example, the name (title) of the quest, the release conditions, and enemy character appearance information. In the case of a normal quest, for example, the release condition may include the fact that the immediately previous quest has been cleared, and in the case of a limited-time quest, the release time slot and period may be included. The enemy character appearance information includes character IDs of the various characters that appear in the game field during quest execution. For example, the character appearance information may include character IDs of enemy characters (ordinary monsters), or of boss characters (boss monsters) that appear at the destination.

The acquisition means 52 is a functional means for acquiring the current position of the player. In one or more embodiments, the acquisition means 52 acquires information about the player's current position in the real world. For example, the acquisition means 52 acquires the latitude and longitude indicating the current position of the terminal device 12 owned by the player from the GPS receiving unit 39 at regular time intervals (such as every 5 seconds).

The setting means 110 is a functional means for setting the destination of a quest. In one or more embodiments, the setting means 110 automatically sets a location pre-registered by the player as the destination of the quest. For example, the setting means 110 may set the first location (such as restaurant D) corresponding to the first schedule included in the schedule information of the player information 50A as the destination of the first quest. The first quest may be a normal quest, for example, with the highest level of difficulty among the quests that can be selected by the player (the most recently released quest).

Also, the setting means 110 sets a second location corresponding to the second schedule included in the schedule information of the player information 50A as the destination of the second quest, in response to the execution of the first quest by the player. The second schedule is a schedule that comes after the first schedule. The second location is a location that is different from the first location, and is, for example, a location that is at least a specific distance (such as 50 meters) away from the first location corresponding to the first schedule. The second quest may be, for example, a normal quest that is different from the first quest, and is the next quest after the first quest.

The control means 111 is a functional means for controlling the entire game. In one or more embodiments, the control means 111 executes an event in a quest once the acquisition means 52 has determined that the player's current position has reached the destination of that quest. This event may be, for example, a battle game against a boss character that appears at the destination of the quest.

Also, the control means 111 notifies the player to execute that event when the player's current position reaches the vicinity of the destination (such as within a radius of 20 meters). This notification may be displayed, for example, on the touch panel 32 of the terminal device 12 owned by the player. Then, the control means 111 executes the event in the quest if the player has responded to the notification by pressing the touch panel 32.

Processing Flow

Figure 14:
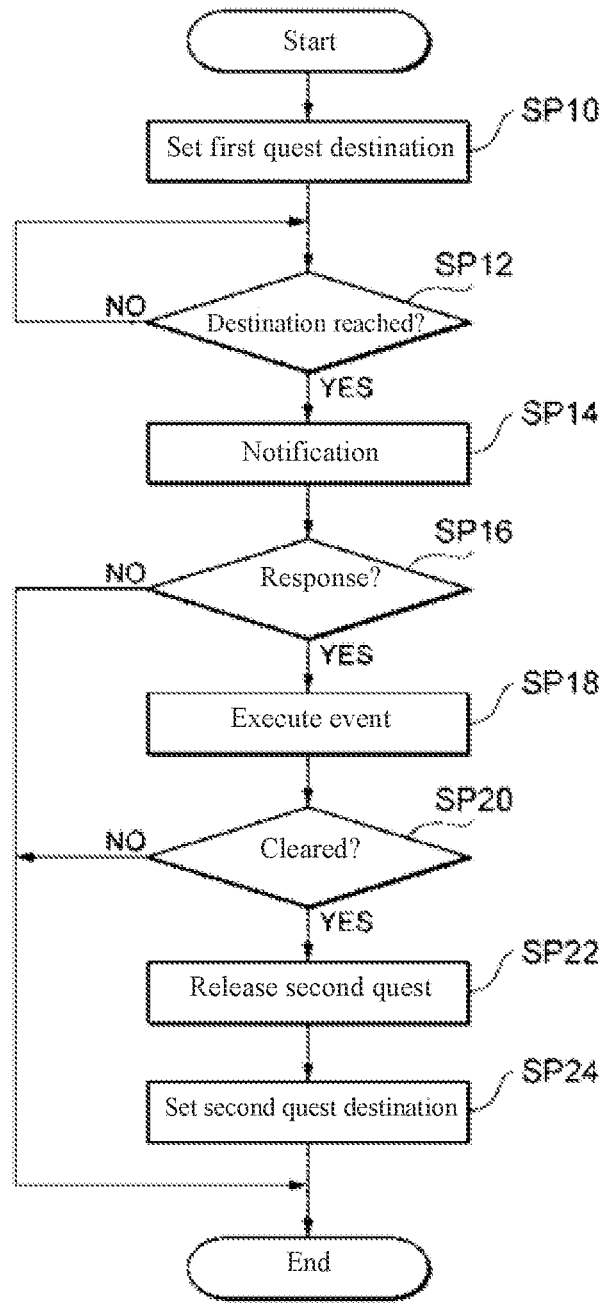
FIG. 14 is a flowchart showing an example of the processing flow performed by various functional means shown in FIG. 13, in a game system according to one or more embodiments.

FIG. 14 is a flowchart showing an example of the processing flow performed by various functional means shown in FIG. 13 in the game system 1 according to one or more embodiments. Also, the processing of the following steps is commenced, for example, according to timing based on the start time corresponding to the first schedule (most recent schedule) registered in advance by the player. An example of this timing might be 15 minutes before the start time. The order and details of the following steps can be varied as needed.

Step SP10

The setting means 110 refers to the player information 50A and acquires the first schedule included in the schedule information and the execution quest information of the quest progress information. Then, the setting means 110 sets the first location corresponding to the first schedule as the destination of the first quest (quest A), which is a normal quest being executed by the player. For example, the setting means 110 converts the site of "Restaurant D," which is the first location, into position information (such as latitude and longitude) and then sets this position information as the destination of the first quest. Then, the control means 111 displays a destination notification screen 115 on the touch panel 32 as a notification to the player that the destination of the first quest has been set. This notification may be, for example, a push notification to the terminal device 12 owned by the player.

Figure 15:
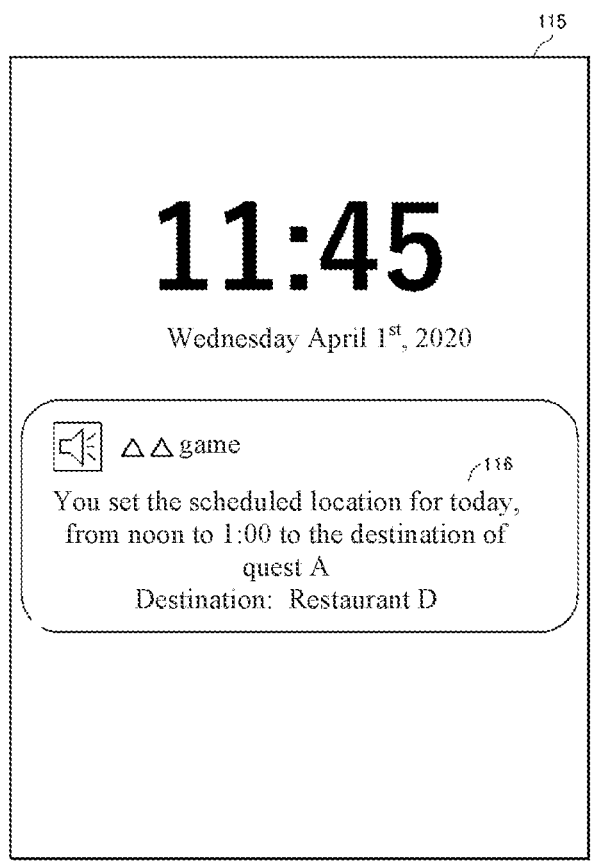
FIG. 15 is a diagram showing an example of a destination notification screen of a first quest according to one or more embodiments.

FIG. 15 is a diagram showing an example of the destination notification screen 115 of the first quest according to one or more embodiments.

As shown in FIG. 15, the destination notification screen 115 is provided with a notification area 116. The notification area 116 shows that the location (first location) corresponding to the schedule (first schedule) registered in advance by the player has been set as the destination of the first quest.

Returning to FIG. 14, the process moves to the processing of step SP12.

Step SP12

The control means 111 determines whether or not the current position of the player acquired by the acquisition means 52 has reached the destination of the first quest, that is, the first location. For example, the control means 111 determines whether or not the player's current position has reached the vicinity of the destination of the first quest set in step SP10 (such as within a radius of 20 meters). If the determination is positive, the processing moves to step SP14. On the other hand, if the determination is negative, the processing of step SP12 is repeated.

Step SP14

The control means 111 displays an event notification screen 120 on the touch panel 32 as a notification encouraging the player to execute an event. This notification may be, for example, a push notification to the terminal device 12 owned by the player.

Figure 16:
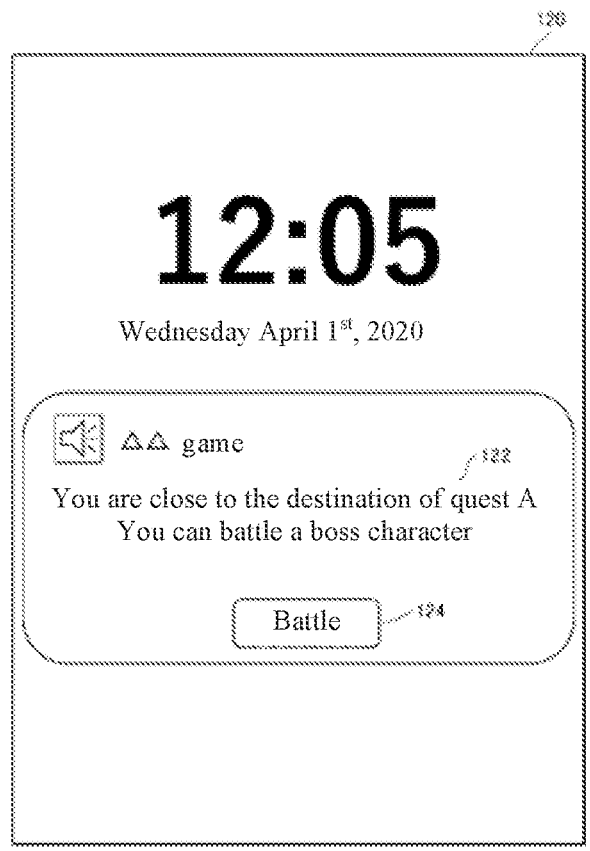
FIG. 16 is a diagram showing an example of an event notification screen according to one or more embodiments.

FIG. 16 is a diagram showing an example of the event notification screen 120 according to one or more embodiments.

As shown in FIG. 16, the event notification screen 120 is provided with a notification area 122 and a battle button 124. The notification area 122 shows that a battle game (event) against the boss character corresponding to the first quest can be executed based on the vicinity of the destination of the first quest. The battle button 124 is a button for issuing an instruction to start a battle game against a boss character.

Returning to FIG. 14, the processing moves to the processing of step SP16.

Step SP16

The control means 111 determines whether or not the player has responded by pressing the battle button 124 on the event notification screen 120. If the determination is positive, the processing moves to step SP18. On the other hand, if the determination is negative, the processing series shown in FIG. 14 is ended.

The control means 111 executes a battle game (event) against a boss character corresponding to the first quest. For example, the control means 111 causes the touch panel 32 to display the execution screen of the first quest immediately after the game is started. Then, the control means 111 executes the battle game on the basis of the ability information about the player character and the ability information about the boss character. The processing then moves to step SP20.

Step SP20

The control means 111 determines whether or not the battle game (event) executed in step SP18 has been cleared. For example, when the hit points of the boss character drop to zero or less, the determination by the control means 111 is positive. On the other hand, if the hit points of all the player characters used by the player drop to zero or less, the determination by the control means 111 is negative. If the determination is positive, the processing moves to step SP22. On the other hand, if the determination is negative, the processing series shown in FIG. 14 is ended.

Step SP22

The control means 111 releases the second quest (quest B), which is the next quest after the first quest. More specifically, the control means 111 adds the quest ID of the second quest to the selectable quests in the quest progress information. Then, the control means 111 updates the normal quest being executed by the player. More specifically, the control means 111 updates the execution quest information included in the quest progress information of the player information 50A from the quest ID of the first quest to the quest ID of the second quest. The processing then moves to step SP24.

Step SP24

The setting means 110 refers to the player information 50A and sets the second location corresponding to the second schedule included in the schedule information as the destination of the second quest. If the second location is not at least a specific distance (such as 50 meters) away from the first location, which is the destination of the first quest, for example, the setting means 110 may set a third location corresponding to the third schedule included in the schedule information as the destination of the second quest. Then, the control means 111 displays on the touch panel 32 a destination setting screen 130 indicating that the destination of the second quest has been set by the player.

Figure 17:
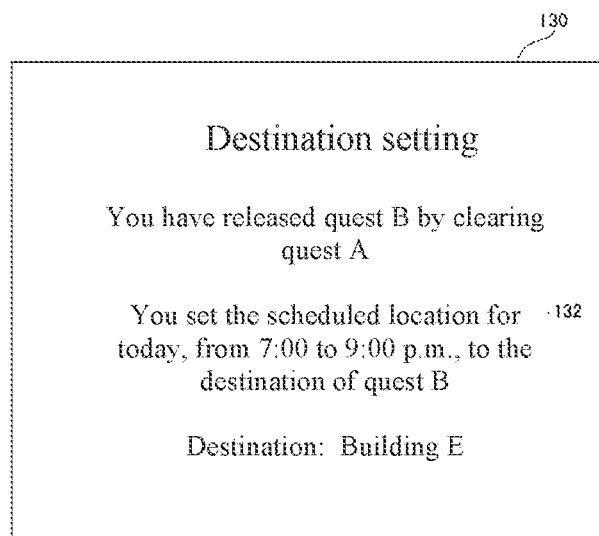
FIG. 17 is a diagram showing an example of a destination setting screen of a second quest according to one or more embodiments.

FIG. 17 is a diagram showing an example of the destination setting screen 130 of the second quest according to one or more embodiments.

As shown in FIG. 17, the destination setting screen 130 is provided with a destination information area 132. The destination information area 132 shows that the location (second location) corresponding to a schedule (second schedule) registered in advance by the player has been set as the destination of the second quest.

The processing series shown in FIG. 14 is then ended.

Effect

As described above, in one or more embodiments, a computer is made to function as the storage means 50 for storing locations registered in advance by the player, the setting means 110 for setting the registered locations as destinations in quests, and the control means 111 for executing events in the quests on the basis of the arrival by the player at a destination.

With this configuration, because a location registered in advance by the player is set as the destination in a quest, this makes it easier for the player to set destinations in quests.

Also, in one or more embodiments, the control means 111 notifies the player to execute an event once the player has reached the destination.

With this configuration, because the player is notified that an event can be executed, this motivates the player to execute the event.

Also, in one or more embodiments, the control means 111 executes an event when the player responds to a notification.

With this configuration, because the event is executed when there is a response to a notification, this motivates the player to execute the event.

Also, in one or more embodiments, if the location is the first location and the quest is the first quest, the storage means 50 stores a second location that has been registered in advance by the player and is different from the first location, and the setting means 110 sets the second location as the destination of a second quest different from the first quest, in response to the execution of the first quest.

With this configuration, because the second location is set as the destination of the second quest in response to the execution of the first quest, it is easier for the player to set the destination each time a quest is executed.

Also, in one or more embodiments, the second quest is the next quest after the first quest.

With this configuration, because the destination of the second quest, which is the next quest after the first quest, is set, this motivates the player to move on to the next quest.

Also, in one or more embodiments, the second location is at least a specific distance away from the first location.

With this configuration, because the second location is away from the first location, this encourages the player to move, which makes the position information game more interesting.

Also, in one or more embodiments, the first location is a location corresponding to a schedule included in the player's schedule information.

With this configuration, the player does not need to reset a location as the destination of the quest once it has been registered as a schedule, which reduces the burden on the player. In addition, the player can execute events that align with his own schedule.

Also, in one or more embodiments, the schedule information includes the first schedule and the second schedule, which is a schedule after the first schedule, and the second location is a location included in the second schedule.

With this configuration, because a location corresponding to the second schedule, which is a schedule after the first schedule, is set as the destination of the second quest, the player can execute events one after another that align with his own schedule.

Modification Example

The present invention is not limited to or by the specific examples given above. Specifically, even if a person skilled in the art were to make appropriate design changes to the above embodiments, which would also be included in the scope of the present invention so long as it had the features of the present invention. Also, the elements included in the above embodiments and in the modification examples given below could be combined whenever technically possible, and such combinations would also be encompassed by the scope of the present invention so long as the features of the present invention are included.

For example, in one or more embodiments, a case was described in which schedule information including schedules registered by the player by performing an input operation on the touch panel 32 in the game was stored in the player information 50A, but this schedule information may also be information acquired (synchronized) from another application or server device that stores the player's calendar (schedule) information. For example, the control means 111 may acquire this calendar information when requested by the player and put it in the schedule information of the player information 50A. The control means 111 may acquire this calendar information periodically (such as at midnight every day) regardless of any request from the player.

Also, a time slot or a location in which the player routinely moves (or to which he arrives) may be registered in advance as daily schedule information in the player information 50A. For example, in a daily first schedule, a "campus G," which is the school attended by the player, may be registered as a location and "9:00 to 4:00" as a time slot, in association with the schedule ID of the first schedule. Also, for example, in a daily second schedule, "shop H" where the player works part-time may be registered as a location and "5:00 to 8:00 p.m." as a time slot, in association with the schedule ID of the second schedule. Also, for example, in a daily third schedule, "apartment I," which is the home of the player, may be registered as a location and "9:00 p.m. to 8:00 a.m. the next day" as a time slot, in association with the schedule ID of the third schedule. The setting means 110 then sets the registered location as the destination of the quest being executed by the player, at a timing based on the start time of each time slot, for example. More specifically, the setting means 110 may set "campus G" as the destination of the quest at 8:45 a.m. every day, set "shop H" as the destination of the quest at 4:45 p.m. every day, and set "apartment I" as the destination of the quest at 8:45 p.m. every day. The registered locations may be such that different time slots and locations are registered on weekdays and weekends/holidays.

Also, in one or more embodiments, a case was described in which the setting means 110 set the destination of the first quest according to timing based on the start time corresponding to the first schedule registered in advance by the player, but it may instead be set according to any other timing desired by the player.

Also, the setting means 110 may set a location corresponding to the second schedule, which is a schedule after the first schedule, as the destination of the first quest according to the arrival of the end time corresponding to the first schedule registered in advance by the player.

Also, in one or more embodiments, a case was described in which the setting means 110 set the destination of the first quest or the second quest, which were normal quests, but the destination of a limited-time quest may be set instead.

Also, in one or more embodiments, a case was described in which the setting means 110 set a single location as the destination of the first quest or the second quest, but a plurality of locations may instead be set as the destinations of the first quest or the second quest. For example, the setting means 110 may set a plurality of locations registered in advance by the player as destinations in the first quest and the second quest. Examples of the registered locations may include the player's home, workplace, or school, and the start time, end time, and the like need not be associated as described above. Also, it may be a condition that each location set as a destination must be at least a specific distance (such as 100 meters) away.

Also, in one or more embodiments, a case was described in which the setting means 110 set a location registered in advance by the player as the destination of the quest, but a location that the player frequently visits within a certain period (such as one month) from the present (such as home, work, train station, etc.) may be set as the destination of the quest according to a log (record) of the position information of the terminal device 12 owned by the player. Also, the setting means 110 may automatically change the destination of the quest by predicting locations that the player will visit in the future (such as the next location to be visited) according to the player's current position and the log.

Also, in one or more embodiments, a case was described in which the control means 111 repeated the processing of step SP12 in the event that the determination was negative, but if a specific condition is met while this processing is being repeated, the repetition may be halted and the processing series ended. Examples of this specific condition may include that a specific length of time (such as 30 minutes) has elapsed, that the end time of the first schedule has arrived, that the start time of the second schedule has been reached, and that a second location has been set as a destination.

Also, in one or more embodiments, a case was described in which the control means 111 set a second location corresponding to a second schedule as the destination of a second quest in the processing of step SP24, but after the processing of step SP24 has been performed, even if the timing is based on the start time corresponding to the second schedule, the processing series shown in FIG. 14 may not be executed.

Also, in one or more embodiments, a case was described in which the control means 111 executed an event when the player responded to a notification encouraging the execution of the event, but the event may be accumulated without being executed once the current position of the player has reached the destination of the quest. For example, the event notification screen 120 may be provided with an accumulation button, and if the player responds by pressing this accumulation button, the control means 111 accumulates the right to execute that event in the player information 50A. The control means 111 may then execute that event when, for example, there is a request from the player to exercise the right of execution for the accumulated event within a specific period (such as one day) following the accumulation of the event.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

10 . . . server device (computer), 12 . . . terminal device, 50 . . . storage means, 52 . . . acquisition means, 54 . . . determination means, 56 . . . selection means, 58 . . . accumulation means, 60 . . . execution means, 110 . . . setting means, 111 . . . control means

What is claimed is:

1. A non-transitory computer readable recording medium storing instructions that cause a computer to function as:
a control device that comprises a central processing unit (CPU) and a storage device, wherein the control device:
acquires position information about a player in a real world,
stores, in the storage device, accumulation information associated with the player,
further stores, in the storage device, one or both of reward information and appearance frequency that are associated with each of one or more contents,
determines whether or not a specific condition related to a movement or a position of the player has been satisfied based on the position information,
selects one or more of the contents from types of the contents based on the appearance frequency, regardless of a request from the player, in response to determining that the specific condition has been satisfied,
accumulates the selected contents in the accumulation information,
executes an event corresponding to the accumulated contents at the request of the player, gives the player a reward related to the accumulated contents in response to the execution of the event, limits the number of the accumulated contents in the accumulation information to a specific value or less, and when the number of the accumulated contents in the accumulation information has reached the specific value, and when a new content is to be accumulated in the storage device, executes one or both of:

comparing a reward of the new content with a lowest reward of one of the accumulated contents, based on the reward information stored in the storage device, and comparing a frequency of appearance of the new content with a highest frequency of appearance of one of the accumulated contents, based on the appearance frequency stored in the storage device, and upon determining that the new content has a greater reward or a lower frequency of appearance, deletes the one of the accumulated contents that was compared and stores the new content.

2. A non-transitory computer readable recording medium storing instructions that cause a computer to function as:

a control device that comprises a central processing unit (CPU) and a storage device, wherein the control device:

acquires position information about a player in a real world, stores, in the storage device, accumulation information associated with the player, further stores, in the storage device, reward information associated with each of one or more contents, determines whether or not a specific condition related to a movement or a position of the player has been satisfied based on the position information, selects one or more of the contents from types of the contents based on appearance frequency, regardless of a request from the player, in response to determining that the specific condition has been satisfied, accumulates the selected contents in the accumulation information, executes an event corresponding to the accumulated contents at the request of the player, gives the player a reward related to the accumulated contents in response to the execution of the event, limits the number of the accumulated contents in the accumulation information to a specific value or less, and when the number of the accumulated contents in the accumulation information has reached the specific value, and when a new content is to be accumulated in the storage device, determines whether the new content or one of the accumulated contents is associated with the reward that the player has not yet acquired, based on the reward information stored in the storage device, and upon determining that the new content is associated with the reward that the player has not yet acquired, deletes the one of the accumulated contents that is not associated with the reward that the player has not yet acquired and stores the new content.

3. A non-transitory computer readable recording medium storing instructions that cause a computer to function as:

a control device that comprises a central processing unit (CPU) and a storage device, wherein the control device:

acquires position information about a player in a real world, stores, in the storage device, accumulation information associated with the player, further stores, in the storage device, encounter information associated with the player, determines whether or not a specific condition related to a movement or a position of the player has been satisfied based on the position information, selects one or more contents from types of the contents based on appearance frequency, regardless of a request from the player, in response to determining that the specific condition has been satisfied, accumulates the selected contents in the accumulation information associated with the player; and executes an event encountered in the accumulated contents at the request of the player, gives the player a reward related to the accumulated contents in response to the execution of the event, limits the number of the accumulated contents in the accumulated information to a specific value or less, and when the number of the accumulated contents in the accumulation information has reached the specific value, and when a new content is to be accumulated in the storage device, determines whether the player has encountered the new content or one of the accumulated contents, based on the encounter information stored in the storage device, and upon determining that the player has not yet encountered the new content, deletes the one of the accumulated contents that the player has encountered and stores the new content.

4. A non-transitory computer readable recording medium storing instructions that cause a computer to function as:

a control device that comprises a central processing unit (CPU) and a storage device, wherein the control device:

acquires position information about a player in a real world, stores, in the storage device, accumulation information associated with the player, further stores, in the storage device, appearance frequency associated with each of one or more contents and a period of possible accumulation corresponding to the appearance frequency, determines whether or not a specific condition related to a movement or a position of the player has been satisfied based on the position information, selects one or more of the contents from types of the contents based on the appearance frequency, regardless of a request from the player, in response to determining that the specific condition has been satisfied, accumulates the selected contents in the accumulation information, executes an event corresponding to the accumulated contents at the request of the player, gives the player a reward related to the accumulated contents in response to the execution of the event, determines a content for which the period of possible accumulation has elapsed, based on the period of possible accumulation stored in the storage device, and deletes, from the accumulation information stored in the storage device, the content for which the period of possible accumulation has elapsed.

5. A non-transitory computer readable recording medium storing instructions that cause a computer to function as:

a control device that comprises a central processing unit (CPU) and a storage device, wherein the control device:

acquires position information about a player in a real world, stores, in the storage device, accumulation information associated with the player, further stores, in the storage device, one or both of reward information and appearance frequency that are associated with each of one or more contents, determines whether or not a specific condition related to a movement or a position of the player has been satisfied based on the position information, selects one or more of the contents from types of the contents based on the appearance frequency, regardless of a request from the player, in response to determining that the specific condition has been satisfied, accumulates the selected contents as a single group in the accumulation information, executes an event corresponding to the accumulated group at the request of the player, gives the player a reward related to the accumulated contents in response to the execution of the event, limits the number of groups accumulated in the accumulated information to a specific value or less, and when the number of the groups accumulated in the accumulation information has reached the specific value, and when a new group is to be accumulated in the storage device, executes one or both of:

comparing a reward of the new group with a lowest reward of one of the groups, based on the reward information stored in the storage device, and comparing a frequency of appearance of the new group with a highest frequency of appearance of one of the groups, based on the appearance frequency stored in the storage device, and upon determining that the new group has a greater reward or a lower frequency of appearance, deletes the one of the groups that was compared and stores the new group.

6. A non-transitory computer readable recording medium storing instructions that cause a computer to function as:

a control device that comprises a central processing unit (CPU) and a storage device, wherein the control device:

acquires position information about a player in a real world, stores, in the storage device, accumulation information associated with the player, further stores, in the storage device, appearance frequency associated with each group of one or more contents and a period of possible accumulation corresponding to the appearance frequency, determines whether or not a specific condition related to a movement or a position of the player has been satisfied based on the position information, selects one or more of the contents from types of the contents based on the appearance frequency, regardless of a request from the player, in response to determining that the specific condition has been satisfied, accumulates, in a storage device, the selected contents as a single group in the accumulation information, executes an event corresponding to the accumulated group at the request of the player, gives the player a reward related to the accumulated contents in response to the execution of the event, associates the group with a period of possible accumulation according to the appearance frequency of the one or more contents included in the group, limits the number of groups to be accumulated in the accumulation information to a specific value or less, determines the group for which the period of possible accumulation has elapsed, based on the period of possible accumulation stored in the storage device, and deletes, from the accumulation information stored in the storage device, the group for which the period of possible accumulation has elapsed.

7. An information processing device, comprising:

a control device that comprises a central processing unit (CPU) and a storage device, wherein the control device:

acquires position information about a player in a real world, stores, in the storage device, accumulation information associated with the player, further stores, in the storage device, one or both of reward information and appearance frequency that are associated with each of one or more contents, determines whether or not a specific condition related to a movement or a position of the player has been satisfied based on the position information, selects one or more of the contents from types of the contents based on the appearance frequency, regardless of a request from the player, in response to determining that the specific condition has been satisfied, accumulates, in a storage device, the selected contents in the accumulation information, executes an event corresponding to the accumulated one or more contents at the request of the player, gives the player a reward related to the accumulated contents in response to the execution of the event, limits the number of the accumulated contents in the accumulated information to a specific value or less, and when the number of the accumulated contents in the accumulation information has reached the specific value, and when a new content is to be accumulated in the storage device, executes one or both of:

comparing a reward of the new content with a lowest reward of one of the accumulated contents, based on the reward information stored in the storage device, and comparing a frequency of appearance of the new content with a highest frequency of appearance of one of the accumulated contents, based on the appearance frequency stored in the storage device, and upon determining that the new content has a greater reward or a lower frequency of appearance, deletes the one of the accumulated contents that was compared and stores the new content.

8. An information processing device, comprising:
a control device that comprises a central processing unit (CPU) and a storage device, wherein the control device:

acquires position information about a player in a real world, stores, in the storage device, accumulation information associated with the player, further stores, in the storage device, reward information associated with each or one or more contents, determines whether or not a specific condition related to a movement or a position of the player has been satisfied based on the position information, selects one or more of the contents from types of the contents based on appearance frequency, regardless of a request from the player, in response to determining that the specific condition has been satisfied, accumulates, in a storage device, the selected one or more contents in the accumulation information, executes an event corresponding to the accumulated contents at the request of the player, gives the player a reward related to the accumulated one or more contents in response to the execution of the event, limits the number of the accumulated contents in the accumulated information to a specific value or less, and when the number of the accumulated contents in the accumulation information has reached the specific value, and when a new content is to be accumulated in the storage device, determines whether the new content or one of the accumulated contents is associated with the reward that the player has not yet acquired, based on the reward information stored in the storage device, and upon determining that the new content is associated with the reward that the player has not yet acquired, deletes the one of the accumulated contents that is not associated with the reward that the player has not yet acquired and stores the new content.

9. An information processing device, comprising:
a control device that comprises a central processing unit (CPU) and a storage device, wherein the control device:

acquires position information about a player in a real world, stores, in the storage device, accumulation information associated with the player, further stores, in the storage device, encounter information associated with the player, determines whether or not a specific condition related to a movement or a position of the player has been satisfied based on the position information, selects one or more contents from types of the contents based on appearance frequency, regardless of a request from the player, in response to determining that the specific condition has been satisfied, accumulates, in a storage device, the selected contents in the accumulation information, executes an event encountered in the accumulated contents at the request of the player, gives the player a reward related to the accumulated one or more contents in response to the execution of the event, limits the number of the accumulated contents in the accumulated information to a specific value or less, and when the number of the accumulated contents in the accumulation information has reached the specific value, and when a new content is to be accumulated in the storage device, determines whether the player has encountered the new content or one of the accumulated contents, based on the encounter information stored in the storage device, and upon determining that the player has not yet encountered the new content, deletes the one of the accumulated contents that the player has encountered and stores the new content.

10. An information processing device, comprising:
a control device that comprises a central processing unit (CPU) and a storage device, wherein the control device:

acquires position information about a player in a real world, stores, in the storage device, accumulation information associated with the player, further stores, in the storage device, appearance frequency associated with each or one or more contents and a period of possible accumulation corresponding to the appearance frequency, determines whether or not a specific condition related to a movement or a position of the player has been satisfied based on the position information, selects one or more of the contents from types of the contents based on the appearance frequency, regardless of a request from the player, in response to determining that the specific condition has been satisfied, accumulates, in a storage device, the selected one or more contents in the accumulation information, executes an event corresponding to the accumulated contents at the request of the player, gives the player a reward related to the accumulated contents in response to the execution of the event, determines a content for which the period of possible accumulation has elapsed, based on the period of possible accumulation stored in the storage device, and deletes, from the accumulation information stored in the storage device, the content for which the period of possible accumulation has elapsed.

11. An information processing device, comprising:
a control device that comprises a central processing unit (CPU) and a storage device, wherein the control device:

acquires position information about a player in a real world, stores, in the storage device, accumulation information associated with the player, further stores, in the storage device, one or both of reward information and appearance frequency that are associated with each of one or more contents, determines whether or not a specific condition related to a movement or a position of the player has been satisfied based on the position information, selects one or more of the contents from types of the contents based on the appearance frequency, regardless of a request from the player, in response to determining that the specific condition has been satisfied, accumulates, in a storage device, the selected contents as a single group in the accumulation information, executes an event corresponding to the accumulated group at the request of the player, gives the player a reward related to the accumulated contents in response to the execution of the event, limits the number of groups accumulated in the accumulated information to a specific value or less, and when the number of the groups accumulated in the accumulation information has reached the specific value, and when a new group is to be accumulated in the storage device, executes one or both of:

comparing a reward of the new group with a lowest reward of one of the groups, based on the reward information stored in the storage device, and comparing a frequency of appearance of the new group with a highest frequency of appearance of one of the groups, based on the appearance frequency stored in the storage device, and upon determining that the group has a greater reward or a lower frequency of appearance deletes the one of the groups that was compared and stores the new content.

12. An information processing device, comprising:

a control device that comprises a central processing unit (CPU) and a storage device, wherein the control device:

acquires position information about a player in a real world, stores, in the storage device, accumulation information associated with the player, further stores, in the storage device, appearance frequency associated with each group of one or more contents and a period of possible accumulation corresponding to the appearance frequency, determines whether or not a specific condition related to a movement or a position of the player has been satisfied based on the position information, selects one or more of the contents from types of the contents based on the appearance frequency, regardless of a request from the player, in response to determining that the specific condition has been satisfied, accumulates, in a storage device, the selected contents as a single group in the accumulation information, executes an event corresponding to the accumulated group at the request of the player, gives the player a reward related to the accumulated contents in response to the execution of the event, associates the group with a period of possible accumulation according to the appearance frequency of the one or more contents included in the group, limits the number of groups to be accumulated in the accumulation information to a specific value or less, determines the group for which the period of possible accumulation has elapsed, based on the period of possible accumulation stored in the storage device, and deletes, from the accumulation information stored in the storage device, the group for which the period of possible accumulation has elapsed.

* * * * *